(12) United States Patent
Stone

(10) Patent No.: US 10,955,596 B1
(45) Date of Patent: Mar. 23, 2021

(54) NANOFABRICATED VOLUME GRATINGS

(71) Applicant: Wavefront Research. Inc, Northampton, PA (US)

(72) Inventor: Thomas W. Stone, Hellertown, PA (US)

(73) Assignee: Wavefront Research, Inc., Northhampton, PA (US)

( * ) Notice: Subject to any disclaimer, the term of this patent is extended or adjusted under 35 U.S.C. 154(b) by 339 days.

(21) Appl. No.: 14/216,999

(22) Filed: Mar. 17, 2014

Related U.S. Application Data

(60) Provisional application No. 61/800,359, filed on Mar. 15, 2013.

(51) Int. Cl.
*G02B 5/00* (2006.01)
*G02B 5/18* (2006.01)

(52) U.S. Cl.
CPC ......... *G02B 5/1866* (2013.01); *G02B 5/1847* (2013.01); *G02B 5/1852* (2013.01); *G02B 2005/1804* (2013.01)

(58) Field of Classification Search
CPC .. G02B 5/1866; G02B 5/1852; G02B 5/1847; G02B 2005/1804
See application file for complete search history.

(56) References Cited

U.S. PATENT DOCUMENTS

| | | | | |
|---|---|---|---|---|
| 7,072,564 B2 * | 7/2006 | Shelnut | ............ | G02B 1/045 264/1.24 |
| 2002/0099308 A1 * | 7/2002 | Bojan | ............ | A61B 5/14514 600/309 |
| 2003/0142405 A1 * | 7/2003 | Hoose | ............ | G02B 5/18 359/567 |
| 2004/0179268 A1 * | 9/2004 | Barbastathis | ........ | G02B 5/1828 359/573 |
| 2006/0228635 A1 * | 10/2006 | Suleski | ............ | B82Y 10/00 430/5 |
| 2010/0053611 A1 * | 3/2010 | Padmore | ............ | B29D 11/0073 356/328 |
| 2010/0177388 A1 * | 7/2010 | Cohen | ............ | G02B 6/0038 359/566 |
| 2012/0019884 A1 * | 1/2012 | Volodin | ............ | G02B 5/1857 359/12 |
| 2012/0122731 A1 * | 5/2012 | Soh | ............ | B01L 3/502761 506/12 |
| 2013/0107367 A1 | 5/2013 | Zhu et al. | | |
| 2015/0322286 A1 * | 11/2015 | Cabrini | ............ | G03F 7/0002 428/195.1 |

FOREIGN PATENT DOCUMENTS

WO    WO 01/21538    * 3/2001

OTHER PUBLICATIONS

Doolittle, A. Lecture 7: Lithography and Pattern Transfer. Georgia Tech School of Electrical and Computer Engineering Lectures, available at: http://users.ece.gatech.edu/~alan/ECE6450/Lectures/ECE6450L7-Optical%20Lithography.pdf.

(Continued)

*Primary Examiner* — Mathieu D Vargot
(74) *Attorney, Agent, or Firm* — Culhane Meadows PLLC; Orlando Lopez

(57) ABSTRACT

Methods to manufacture volume transmission diffraction grating (quasi-Bragg gratings) and volume transmission diffraction gratings made by those methods.

14 Claims, 29 Drawing Sheets

(56) References Cited

OTHER PUBLICATIONS

Ebizuka, N. et al. Novel immersion grating, VPH grating and quasi-Bragg grating. Proc. SPIE 6273, Optomechanical Technologies for Astronomy, 62732G (Jul. 6, 2006).

Lai, M. et al. Multilayer porous silicon diffraction gratings operating in the infrared. Nanoscale Research Letters 2012, 7:645.

Paipulas, D. et al., Permanent volume Bragg grating fabrication in pure lithium niobate crystal using direct laser writing technique, CLEO/Europe and EQEC 2011 Conference Digest, OSA Technical Digest (CD) (Optical Society of America, 2011), paper CM_P9.

Maclachlan, D.G. et al. Mid-Infrared Volume Phase Gratings Manufactured using Ultrafast Laser Inscription, © 2013 Optical Society of America.

Itoh, K. et al. Pulsed-Laser Micro-Fabrication, © Copyright 2004, IEEE.

Bianco, G. et al. Volume Holographic Gratings: Fabrication and Characterization, Holography: Advances and Modern Trends IV. edited by Miroslav Hrabovsky, John T. Sheridan, Antonio Fimia, Proc. of SPIE vol. 9508, 950807 © 2015.

\* cited by examiner

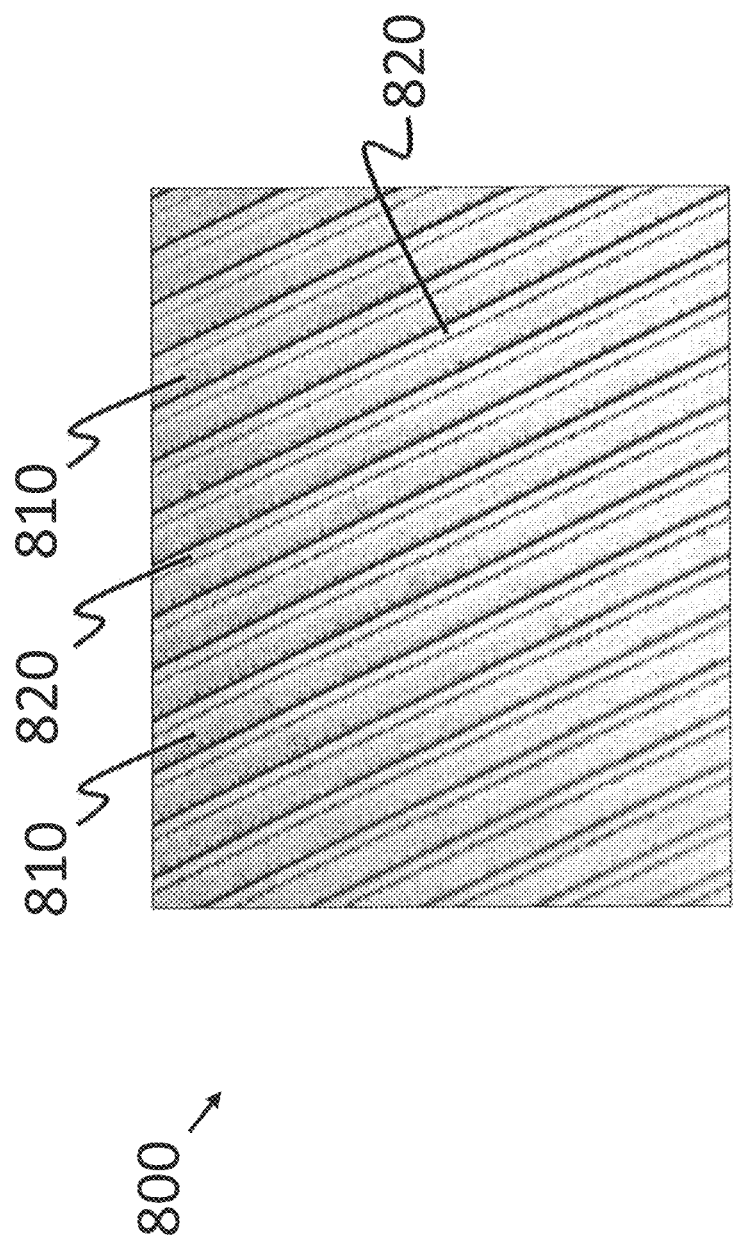

NANOFABRICATED VOLUME GRATINGS

CROSS REFERENCE TO RELATED APPLICATIONS

This application claims priority from U.S. Provisional Patent Application Ser. No. 61/800,359, filed Mar. 15, 2013, entitled NANOFABRICATED VOLUME GRATINGS and incorporated herein by reference in its entirety for all purposes.

STATEMENT OF GOVERNMENT INTEREST

This invention was made with U.S. Government support from the U.S. Air Force under Contracts FA8650-04-M-1653 and FA8650-05-C-1816, and the U.S. Army under Contracts W15P7T-05-C-F001 and W15P7T-06-C-F001. The U.S. Government has certain rights in the invention.

BACKGROUND OF THE INVENTION

This invention relates generally to volume transmission diffraction grating (quasi-Bragg gratings).

A number of devices, such as hyperspectral imagers, use high efficiency and broad spectral bandwidth transmission diffraction gratings and the performance of the device is dependent on the use of use high efficiency and broad spectral bandwidth transmission diffraction gratings.

There is a need for methods to manufacture volume transmission diffraction grating (quasi-Bragg gratings) and for volume transmission diffraction gratings made by those methods.

SUMMARY OF THE INVENTION

The various embodiments of the present teachings disclose methods to manufacture volume transmission diffraction grating (quasi-Bragg gratings) and volume transmission diffraction gratings made by those methods.

For a better understanding of the present invention, together with other and further objects thereof, reference is made to the accompanying drawings and detailed description.

BRIEF DESCRIPTION OF THE DRAWINGS

The present invention is illustratively shown and described in reference to the accompanying drawings, in which:

FIG. 29 shows a 20 µm period grating structure molded into germanium.

DETAILED DESCRIPTION OF THE DRAWINGS

The present invention is introduced using examples and particular embodiments for descriptive purposes. Although a variety of examples are presented to show how various configurations can be employed to achieve the desired improvements, these particular embodiments are only illustrative and not intended in any way to restrict the inventions presented.

The novel compact high performance transmission grating based hyperspectral imagers developed in this effort are enabled by high efficiency and broad spectral bandwidth transmission diffraction gratings. This performance has been shown feasible and demonstrated in the NIR and SWIR bands in this effort. In order to obtain this level of performance in transmission gratings for the MWIR and LWIR bands, lithographic techniques were used to fabricate volume transmission gratings. In this approach, alternating regions of high and low index material were lithographically etched or deposited to produce refractive index variations throughout a volume (typically on the order of 10 wavelengths thick) using non-absorbing or slightly absorbing materials for the spectral bands of interest. This type of grating is illustrated in FIG. 1.

Annealing and similar techniques may be used to smooth the refractive index profile and some materials and geometries may even result in sinusoid-like modulation profiles. However, refractive index profiles with some degree of stepped- or square-wave-characteristics are easy to produce, easily controlled, and inexpensive. For these reasons, it was important to develop an accurate model for volume phase gratings with varying degrees of a stepped modulation profile. This model was used to guide the initial material and parameter selections for the feasibility experiments. The following section describes the progress made during this effort to expand the thin grating decomposition theory to include square wave and other refractive index profiles.

Figure 1:
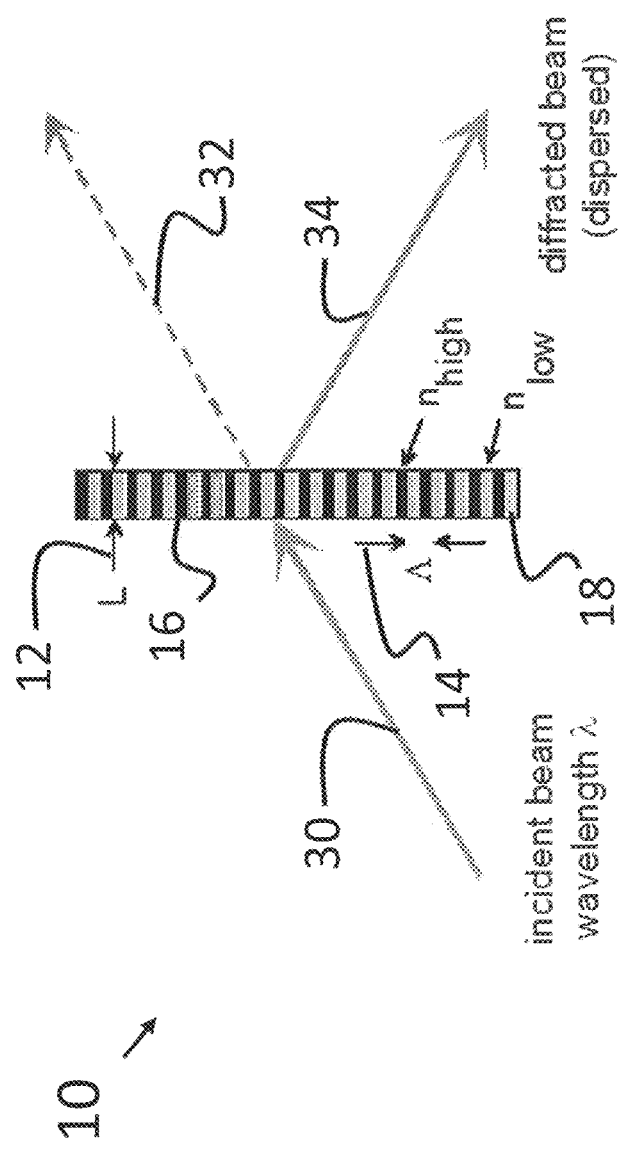
FIG. 1 shows a cross section of a lithographically fabricated volume transmission diffraction grating.

FIG. 1 shows a lithographically fabricated volume transmission diffraction grating 10. Alternating material regions of high and low refractive index are fabricated making use of lithographic masking, etching, and deposition techniques.

The grating thicknesses are typically on the order of ten wavelengths, and often the grating profiles are characterized by square-wave modulation.

As discussed in Sections reference to figures below, it was both theoretically and experimentally demonstrated that polymer-dispersed liquid crystal (PDLC)-based volume transmission gratings can meet the high efficiency and broad spectral bandwidth requirements for the WRI compact, lightweight, visible—SWIR (0.5-1.7 micron) hyperspectral imaging sensor. These PDLC-based gratings, however, are limited in the extent of their spectral transmission bands due to the transmission characteristics of the polymer matrices. Lithographically generated volume transmission gratings, which can be produced using standard lithographic techniques, are limited only by the transmission characteristics of the substrate material, and can therefore be extended for use in the MWIR, LWIR, and other spectral bands. For example, a grating structure may be written on a lithographic mask and transferred into fused silica, sapphire, gallium arsenide, silicon, germanium, and perhaps other substrate materials such as barium titanate, magnesium fluoride etc. using well characterized processes such as reactive ion etching. In this phase of the effort volume transmission gratings were lithographically produced in $SiO_2$ substrates. The feasibility demonstration of this technique is extended further into the infrared with lithographically fabricated gratings in silicon.

Conventional Lithographic Masks

Figure 2:
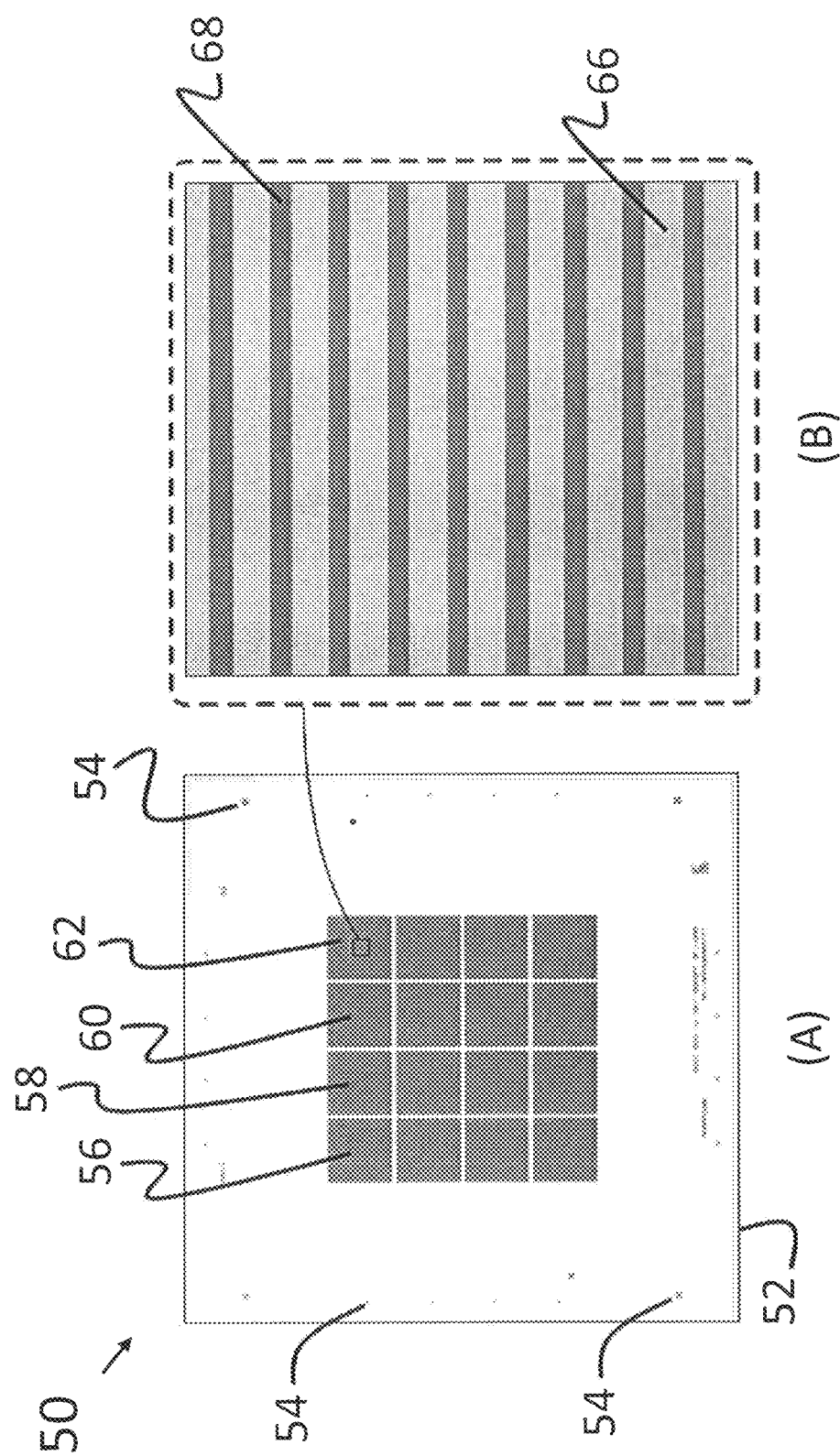
FIGS. 2A and 2B show a photolithographic mask layout at different magnifications.

A 5 inch square chrome-on-quartz mask containing a 4×4 array of 16 square wave binary gratings, each 15 mm square, and each with variations in spatial frequency and duty cycle was designed at the Cornell Nano-Scale Science & Technology Facility (a member of the National Nanofabrication Users Network) and is illustrated in FIGS. 2A and 2BA. This 5 inch square chrome-on-quartz mask contains a 4×4 array of 16 gratings, each of which is 15 mm square, and contains a unique spatial frequency and duty cycle combination. A detailed blow-up of a single grating region is illustrated in FIGS. 2A and 2BB.

This pattern was then etched into the selected substrate to a depth which represents the thickness L of the grating using lithographic techniques. This thickness is an important variable in the optimization of the spectral bandwidth and efficiency of the grating. The duty cycle variation is useful for effectively tuning the refractive index modulation, which can alternatively be accomplished by filling the etched grating with other materials. This mask was used to expose photoresist on transparent transmission grating substrates such as fused silica and silicon, which was then transferred into the substrate using techniques such as reactive ion etching. The resulting diffraction gratings are designed to operate in the volume (quasi-Bragg) diffraction regime yielding high peak diffraction efficiencies and broad spectral bandwidths.

FIGS. 2A and 2B show a photolithographic mask layout. FIG. 2A shows a 5 inch square chrome-on-quartz mask 52 containing a 4×4 array of 16 gratings 56, 58, 60, 62, each measuring 15 mm square with variations in spatial frequency and duty cycle, was fabricated and is shown. This mask was used to expose photoresist on transmission grating substrates such as fused silica and silicon, which were then transferred into the substrate using techniques such as reactive ion etching. The resulting diffraction gratings are designed to operate in the volume (quasi-Bragg) diffraction regime yielding high peak diffraction efficiencies and broad spectral bandwidths. FIG. 2B shows a magnified section of the photolithographic grating mask pattern illustrated in FIG. 2A and reveals the 20 micron spatial period of the grating. In this magnified view, the darker regions 68 represent chrome (opaque) areas, while the lighter regions 66 represent transparent areas.

Holographically Written Lithographic Masks

Figure 3:
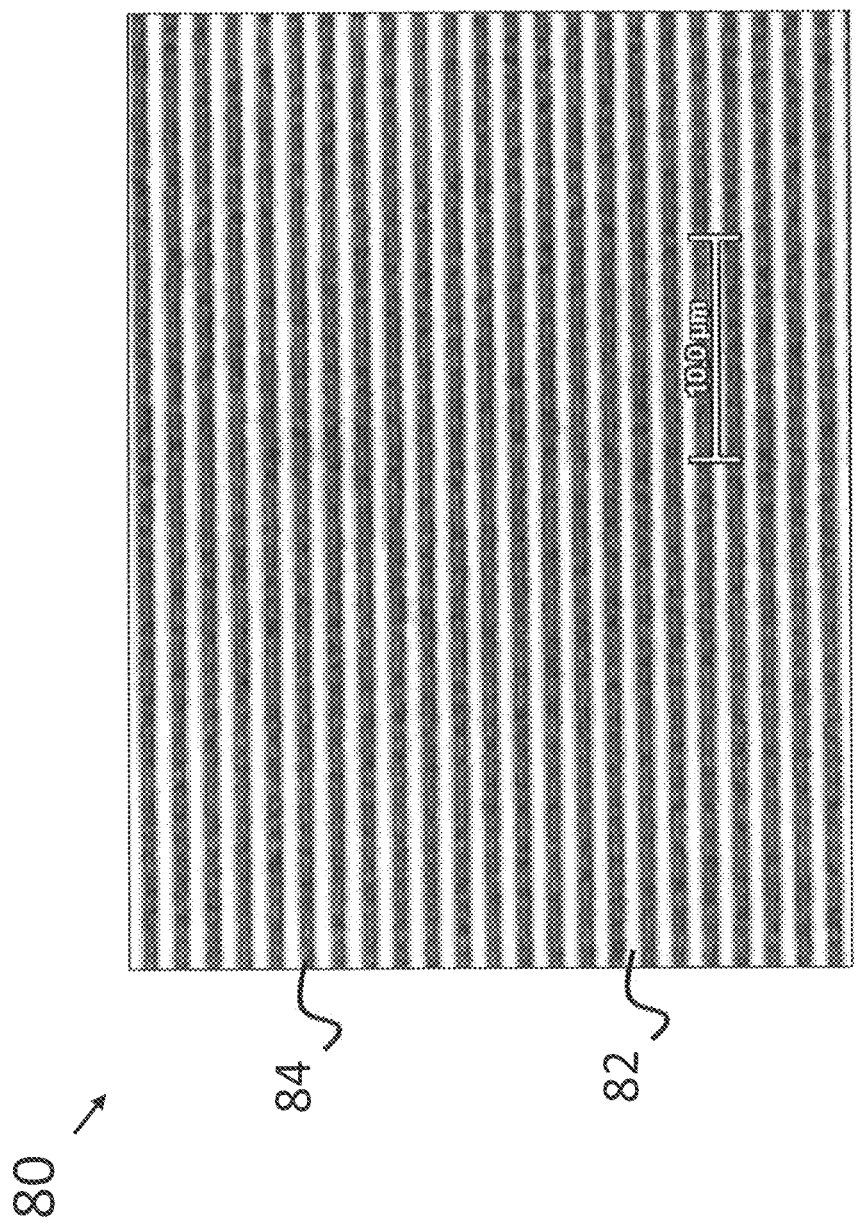
FIG. 3 shows a photomicrograph of a lithographic mask written using holographic techniques.

The benefits of writing the lithographic mask using holographic techniques were also demonstrated in this effort. In this technique, photoresist is deposited on a quartz substrate that has a thin aluminum film evaporated on it. The photoresist coated wafer is then holographically exposed and the photoresist is then processed. Following the photoresist processing, the photoresist pattern is transferred into the aluminum mask layer using ion etching. This gives rise to a very pure, high contrast, and ghost-free mask that can be used to pattern substrates with the aspect ratios desired for high-performance quasi-Bragg regime volume transmission gratings. FIG. 3 is a photomicrograph of a thin aluminum film 80 on a $SiO_2$ substrate and illustrates the purity and ghost free characteristics of the holographically written grating lines. The aluminum film was lithographically etched using holographically exposed photoresist, as described above. This aluminum mask was then used to etch the grating pattern into the quartz substrate using a Plasma-Therm 72 Reactive Ion Etching System.

FIG. 3 shows a photomicrograph of a lithographic mask written using holographic techniques. A thin aluminum film was lithographically etched using holographically exposed photoresist, which was then used to etch the grating pattern into a $SiO_2$ substrate using reactive ion etching. This photomicrograph shows the purity and ghost free characteristics of the grating lines. For visible through SWIR spectral bands, the benefits of writing the mask holographically include low cost and a very pure and ghost-free mask pattern that can be used to pattern substrates with the aspect ratios desired for high-performance quasi-Bragg regime transmission gratings.

For visible through SWIR spectral bands, the benefits of writing the mask holographically include low cost and a very pure and ghost-free mask pattern that can be used to pattern substrates with the aspect ratios desired for high-performance quasi-Bragg regime volume transmission gratings. This holographically written mask technique can also be used for gratings designed to operate in the MWIR and LWIR spectral bands, but for transmission MWIR and LWIR gratings, the typically larger grating periods required make the conventionally written lithographic contact masks described previously a good choice as well.

Figure 4:
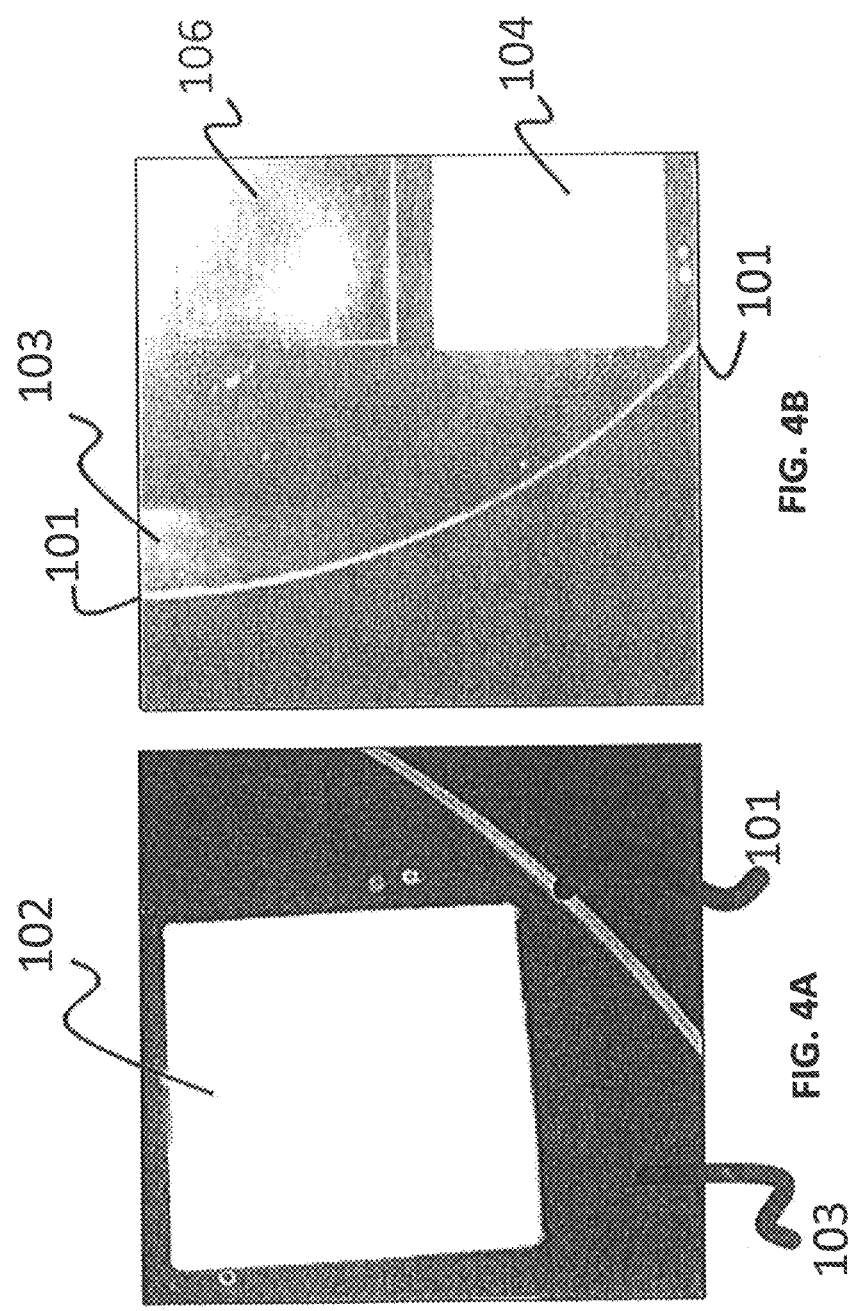
FIGS. 4A and 4B show a photomicrograph of a lithographic mask written using holographic techniques at different magnifications.

An additional lithographically fabricated volume transmission grating on a SiO$_2$ wafer is shown in FIG. 4A. This grating 102 was one of an array of gratings that were simultaneously etched into a SiO$_2$ wafer 103 and the edge 101 of the transparent wafer is visible in the photograph due to scattered light. A larger region of the same SiO$_2$ wafer 103 showing two gratings 104, 106 side-by-side is shown in the photograph of FIG. 4B. The illuminating light is diffracted by the lower grating 104, and the outline of the upper grating 106 is visible.

Lithographically Produced IR Volume Transmission Gratings

The feasibility of lithographically fabricated gratings for use in the visible, NIR, and SWIR bands was demonstrated with gratings lithographically fabricated in SiO$_2$ wafers. In this section, the feasibility of lithographically fabricating the deep-etched structures required for MWIR and LWIR transmission gratings is demonstrated by lithographic fabrication of volume transmission gratings in silicon substrates.

Lithographic Fabrication of Silicon Transmission Gratings

To demonstrate the feasibility of lithographically producing the deep etched profiles, an array of 16 gratings was lithographically etched into 4-inch diameter silicon wafers. The gratings each measured 15 mm on a side, and were had various combinations of spatial period and duty cycle, which are tabulated in Table 1. The varied grating duty cycle is one way to vary the effective refractive index modulation of the gratings, which directly affects the efficiency and bandwidth of the gratings.

TABLE 1

Transmission Grating Spatial Period and Duty Cycle Combinations

| Grating Number | Spatial Period | Grating Duty Cycle |
| --- | --- | --- |
| 1 | 10 μm | 20% |
| 2 | 10 μm | 30% |
| 3 | 10 μm | 40% |
| 4 | 10 μm | 60% |
| 5 | 10 μm | 60% |
| 6 | 10 μm | 70% |
| 7 | 10 μm | 80% |
| 8 | 20 μm | 10% |
| 9 | 20 μm | 20% |
| 10 | 20 μm | 30% |
| 11 | 20 μm | 40% |
| 12 | 20 μm | 50% |
| 13 | 20 μm | 60% |
| 14 | 20 μm | 70% |
| 15 | 20 μm | 80% |
| 16 | 20 μm | 90% |

Figure 5:
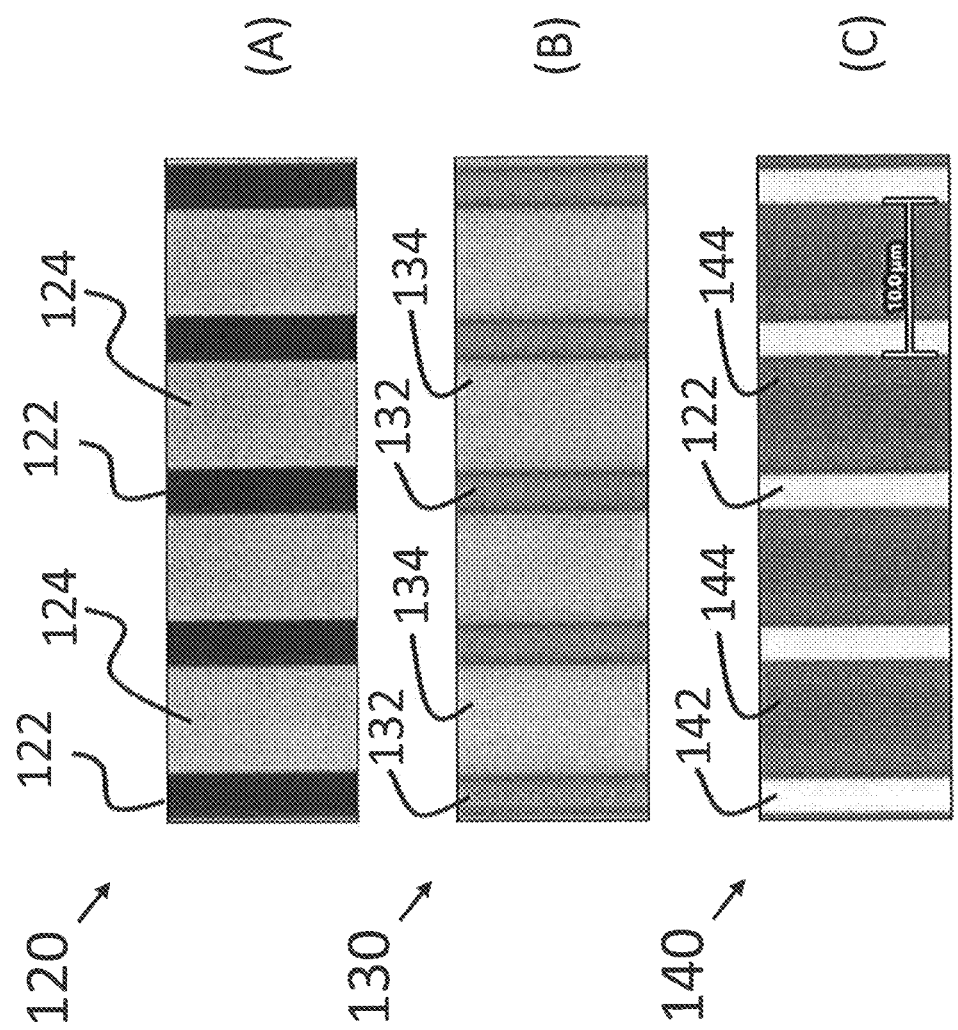
FIGS. 5A, 5B, 5C show a series of photomicrographs tracing the major steps in the lithographic fabrication of a 10 micron period and a 70% clear duty cycle grating.

The lithographic fabrication was performed using the Cornell Nano-Scale Science & Technology Facility (a member of the National Nanofabrication Users Network) where first a chrome on glass mask 120 was designed as described in previously, and is illustrated in the photomicrograph of FIG. 5A. Next, photoresist was spin-coated onto the silicon wafers, which were then exposed through the chrome-on-glass mask using contact lithography with a Karl Suss MA 6 Contact Aligner. After developing the exposed photoresist, a relief image 130 of the photoresist lines was left on the silicon substrate (FIG. 5B), which was then transferred into deep etched structures 140 (FIG. 5C) by means of a Unaxis SLR 770 ICP Deep Silicon Etcher, which is a Bosch fluorine process inductively coupled plasma reactive ion etcher.

The series of photomicrographs 120, 130, 140 traces the major steps in the lithographic fabrication of a 10 micron period, 70% clear duty cycle grating, showing: (a) The chrome mask 120 with its alternating clear 122 and opaque 124 regions (with a duty cycle of 70% clear, 30% opaque) of chrome on glass; (b) The developed photoresist layer 130, which is a relief of photoresist lines on top of a silicon wafer; and (c) The etched silicon wafer 140.

Figure 6:
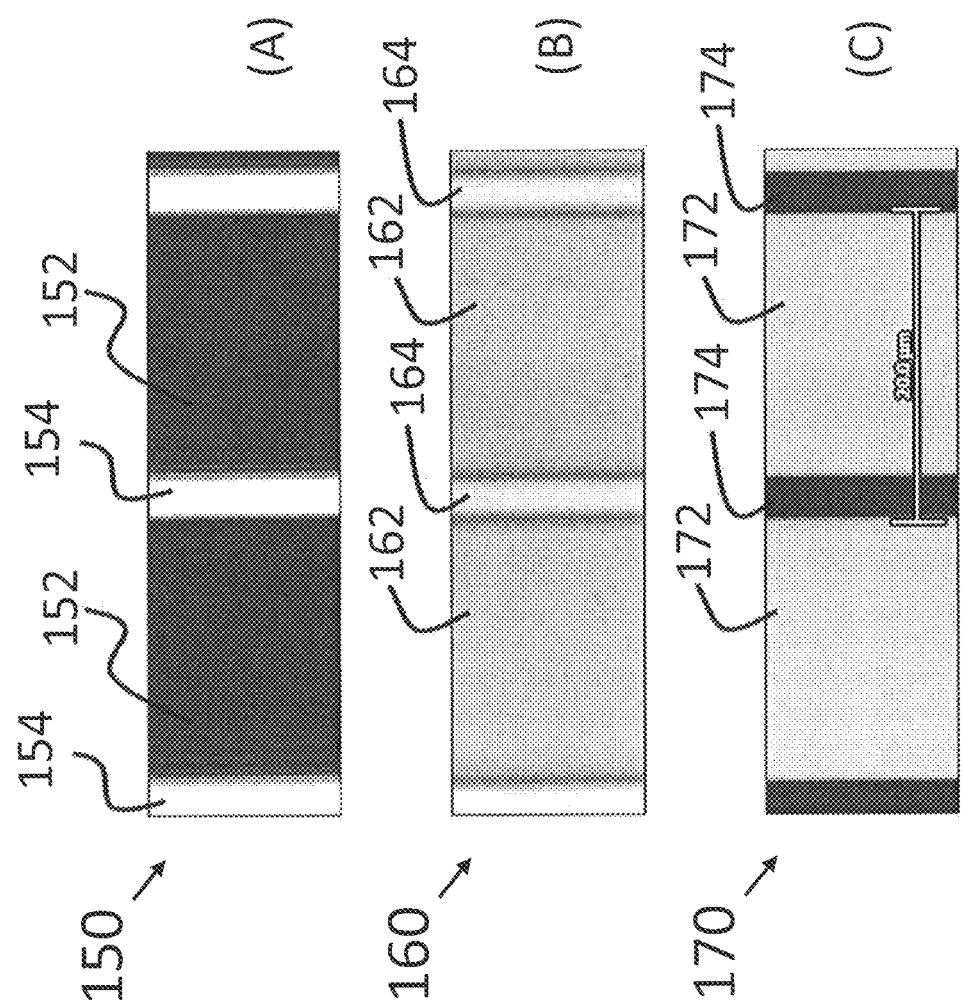
FIGS. 6A, 6B and 6C show a series of photomicrographs tracing the major steps in the lithographic fabrication of a 20 micron period and a 10% clear duty cycle grating.
Figure 7:
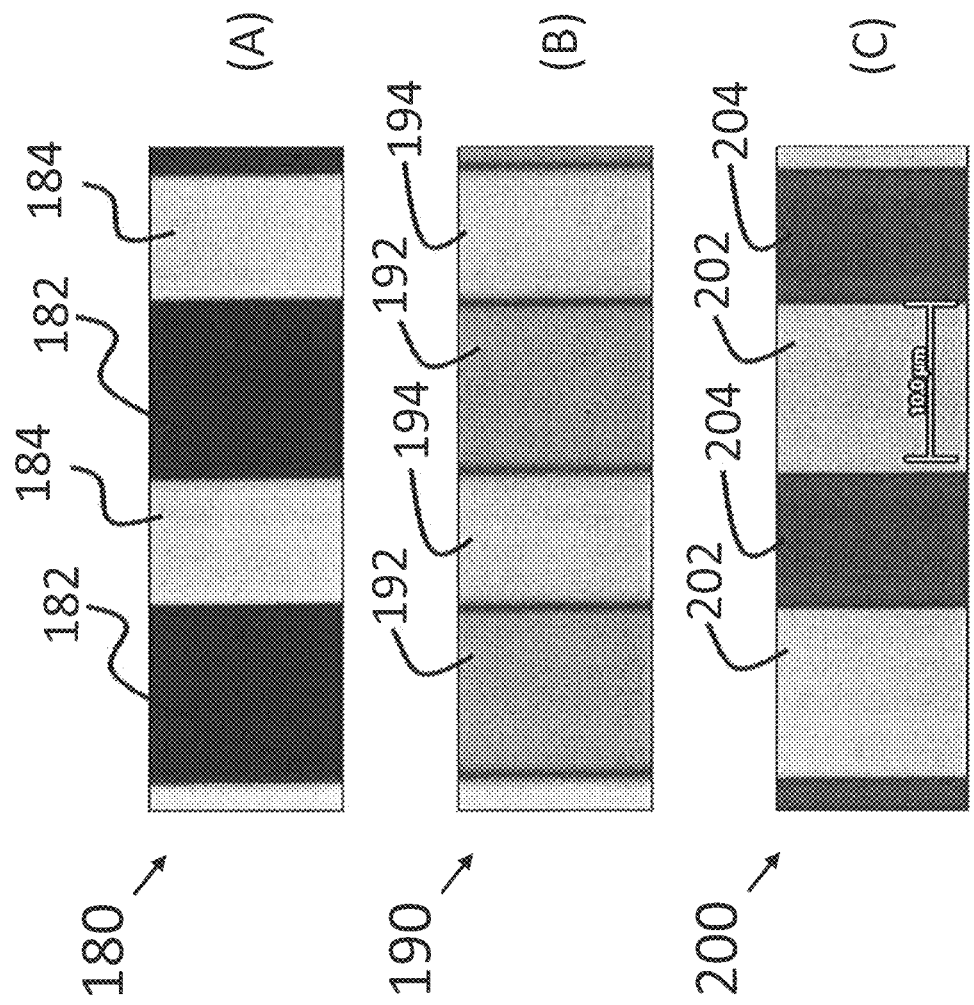
FIGS. 7A, 7B and 7C show a series of photomicrographs tracing the major steps in the lithographic fabrication of a 20 micron period and a 40% clear duty cycle grating.
Figure 8:
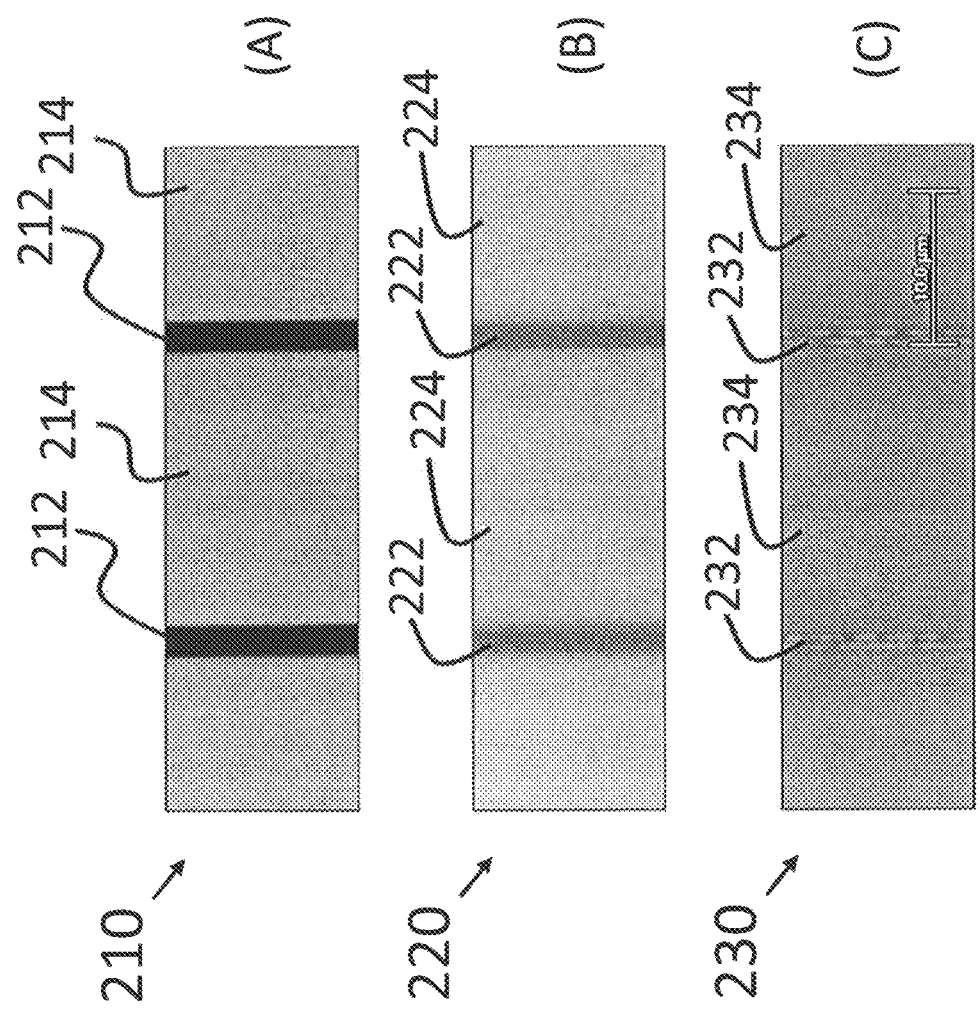
FIGS. 8A, 8B and 8C show a series of photomicrographs tracing the major steps in the lithographic fabrication of a 20 micron period, 90% clear duty cycle grating.

Figures FIGS. 6-8 contain related series of photomicrographs illustrating the major steps in the lithographic fabrication of transmission gratings with a spatial period of 20 microns and with 10% clear duty cycles (FIG. 6), 40% clear duty cycles (FIG. 7), and 90% clear duty cycles (FIG. 8). It is apparent in the limiting case of 90% clear duty cycles that the resulting very thin photoresist lines and narrow silicon walls are near the high-aspect-ratio limit of these first runs. It is expected that the further optimization of exposure and development processes will permit future fabrication of these limiting-case narrow and high-aspect-ratio structures.

The series of photomicrographs of FIGS. 6A-6B traces the major steps in the lithographic fabrication of a 20 micron period, 10% clear duty cycle grating, showing: (a) The chrome mask 150 with its alternating clear 152 and opaque 154 regions (with a duty cycle of 10% clear, 90% opaque) of chrome on glass; (b) The developed photoresist layer 160, which is a relief of photoresist lines on top of a silicon wafer; and (c) The etched silicon wafer 170.

The series of photomicrographs of FIGS. 7A-C traces the major steps in the lithographic fabrication of a 20 micron period, 40% clear duty cycle grating, showing: (a) The chrome mask 180 with its alternating clear 182 and opaque 184 regions (with a duty cycle of 40% clear, 60% opaque) of chrome on glass; (b) The developed photoresist layer 190, which is a relief of photoresist lines on top of a silicon wafer; and (c) The etched silicon wafer 200.

The series of photomicrographs of FIGS. 8A-C traces the major steps in the lithographic fabrication of a 20 micron period, 90% clear duty cycle grating, showing: (a) The chrome mask 210 with its alternating clear 212 and opaque 214 regions (with a duty cycle of 90% clear, 10% opaque) of chrome on glass; (b) The developed photoresist layer 220, which is a relief of photoresist lines on top of a silicon wafer; and (c) The etched silicon wafer 230.

Lithographic Results

Figure 9:
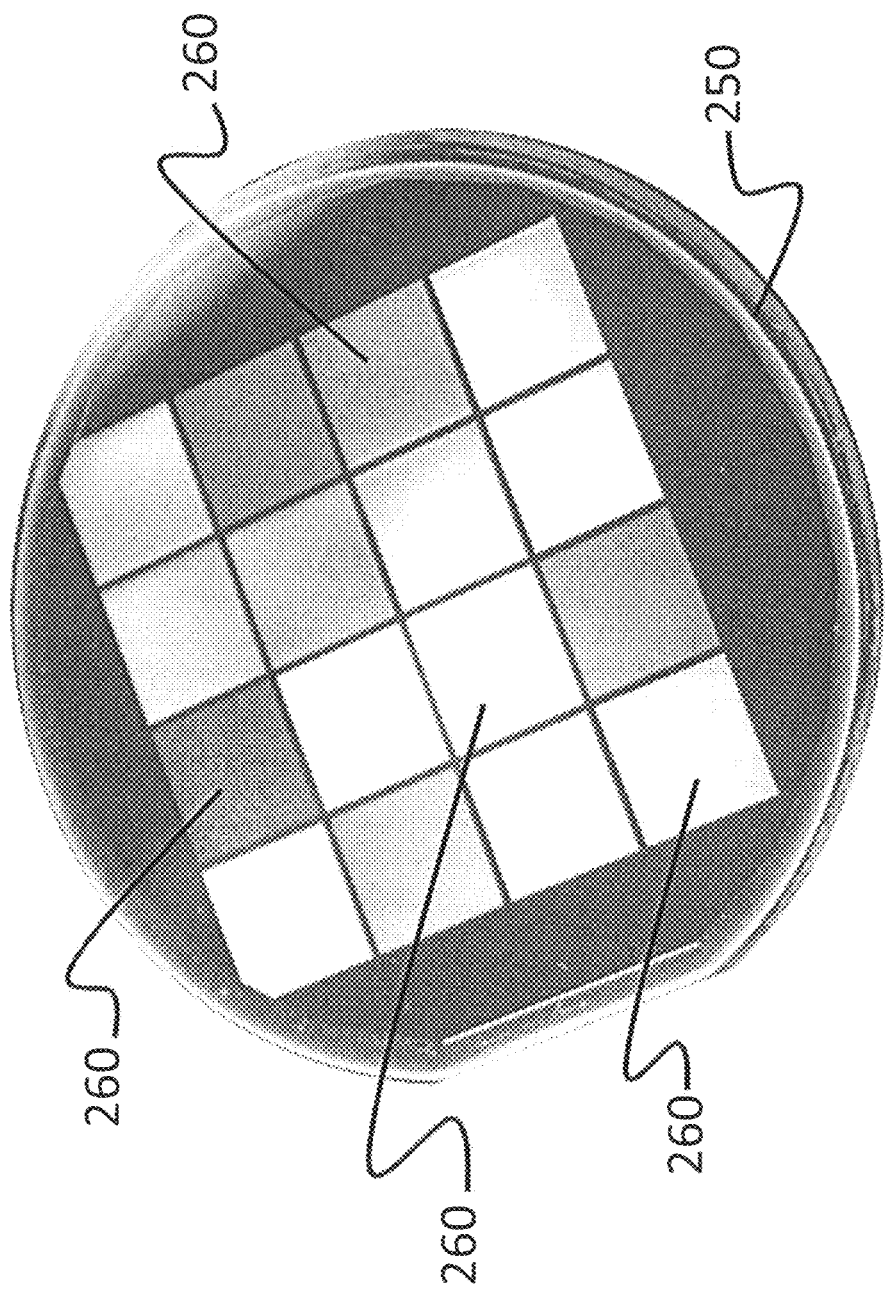
FIG. 9 is a view of an array of 16 transmission gratings on a 4-inch silicon wafer.

The resulting transmission gratings are illustrated in FIG. 9 which is a photograph of a silicon wafer 250 that contains an array of 16 transmission gratings 260. Each of these 16 transmission gratings 260 measures 15 mm on a side and has a different combination of spatial frequency and duty cycle as tabulated in Table 1. This wafer is one of multiple wafers that were fabricated, each with a different etch depth.

The photomicrographs of the resulting gratings shown FIGS. 5C, 6C, 7C and 8C, do not reveal the depth of the etched grating, although when taking the photomicrographs it was apparent that deep structure existed due to the large depth over which modulation was seen when focusing. A more clear indication of the depth of the grating structure is given in the scanning electron micrograph (SEM) shown in FIG. 10. This SEM was taken from an oblique angle above the surface of the wafer 270 near the edge of a 10 micron period grating 272. Following the sidewall 278 down leads to the bottom edge 280 of the grating, from which it is clear that the etched grating is indeed deep, and that the grating structure exhibits very large aspect ratios. These gratings demonstrate the feasibility of using lithographic techniques for the fabrication of deep, high aspect ratio structures required for the high efficiency, broad bandwidth IR transmission gratings modeled in this effort.

The feasibility of lithographically fabricating the deeply etched structures required for the volume transmission gratings has been clearly demonstrated in the fabrication runs described above. A series of rough measurements were made using a $CO_2$ laser at a wavelength of 10.6 microns and one of the 10 micron spatial period gratings described above. These preliminary measurements averaged more than twice the transmitted energy in the first order beam than in the zero-order beam, and little apparent energy in other transmitted orders. Thus the volume transmission grating appears to be operating in the desired quasi-Bragg diffraction regime.

Volume Transmission Grating Experiments

Initial Fused Silica Volume Transmission Diffraction Grating Progress

Figure 11:
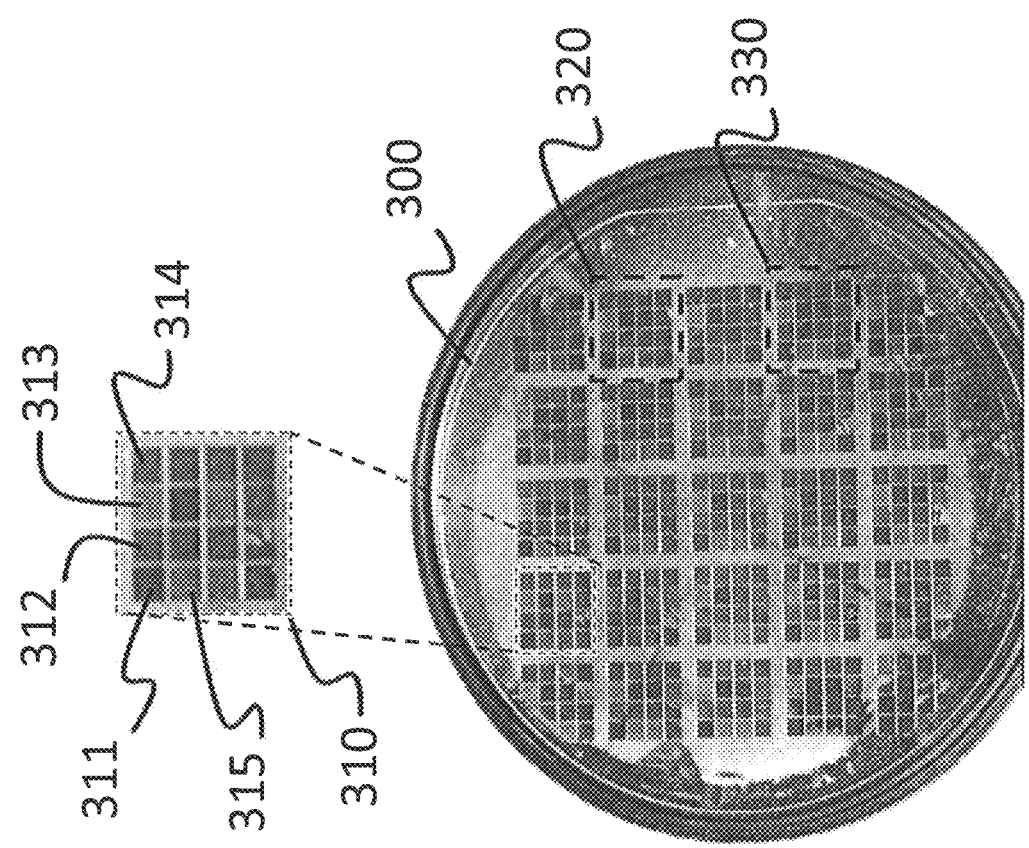
FIG. 11 shows a top view of a fused silica grating test sample.

These feasibility experiments were performed at Cornell University's Center for NanoScale Science Technology Facility (CNF), where several fused silica wafers were coated with photo resist and exposed to the masks generated during the Phase I effort using a 5× stepper in order to allow for the fabrication of smaller grating periods. Since this prior mask contained regions with spatial periods of both 10 µm and 20 µm in a variety of duty cycles, the 5-X reduction from the stepper resulted in the exposure of the photo resist to grating periods of 2 and 4 µm, respectively. After developing the photo resist, a one third of a micron thick layer of aluminum was deposited over the structure and a liftoff process was used to produce aluminum-on-fused-silica grating masks. These samples were then put in a reactive ion etcher to produce the fused silica gratings, a photograph of which is shown in FIG. 11. Scanning electron micrographs (SEMs) were taken at various points across the sample to characterize the etching process.

Figure 12:
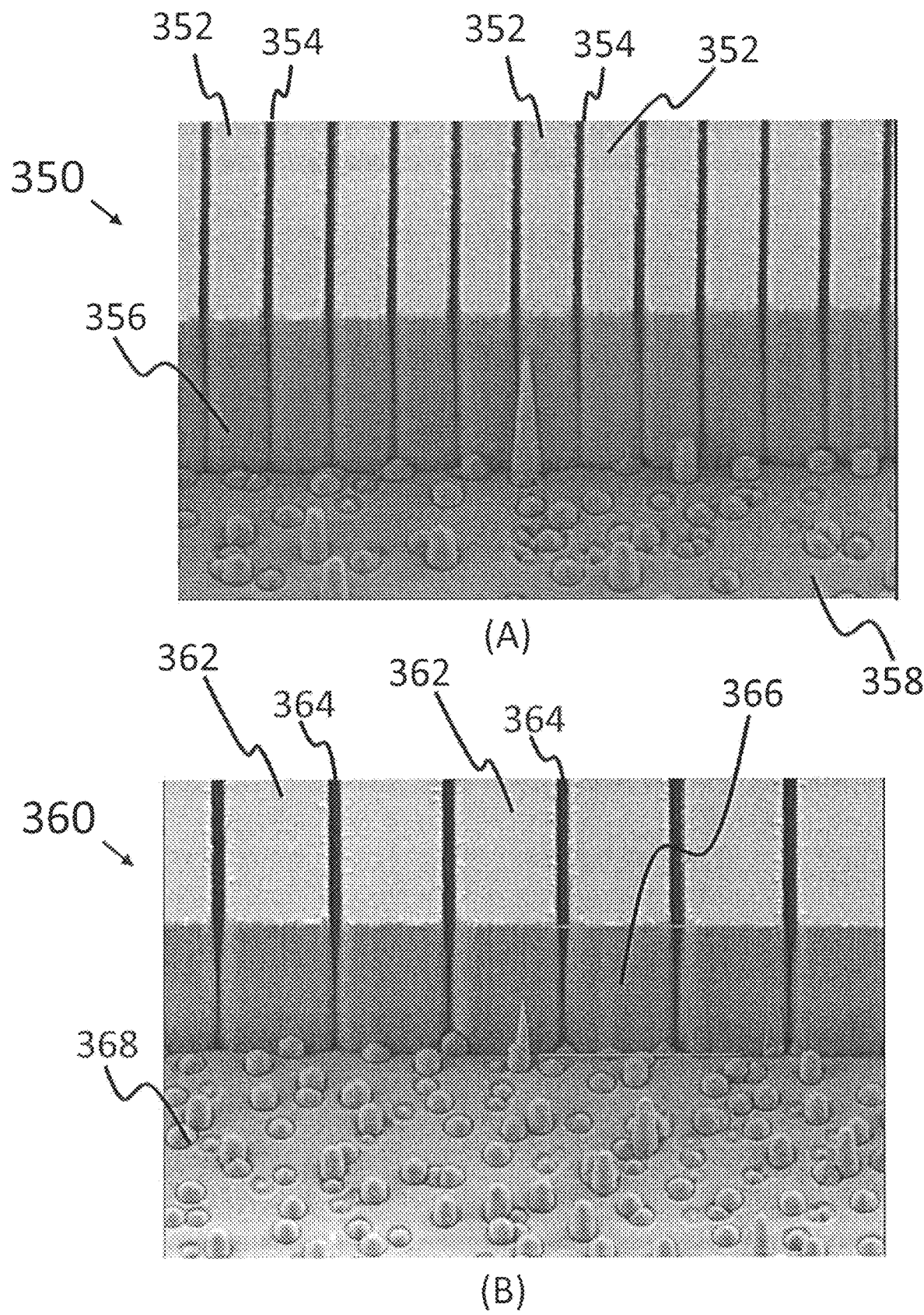
FIGS. 12A and 12B show micrographs of the structure in a 2 µm spatial period grating.

FIG. 12A illustrates an SEM 350 of one of the resulting narrow-open duty cycle fused silica grating 352. The 2 µm grating 352 structure shown illustrates that a large aspect ratio with steep side walls 354 can still be fabricated with reduced periods. The side walls are tapered slightly outwards, which is typical until the process is fully optimized. Spurious structures are observed in the substrate 358, which is due to sputtering from the aluminum mask. In this process, specks of sputtered aluminum act as secondary masks as the substrate is etched. However this secondary structure may be more than simple mask sputtering. FIG. 12B illustrates an etch depth of 4.49 µm for the grating structure 362, where due to the angle of projection the actual depth is approximately twice the apparent etch depth shown, or approximately 9 µm.

Figure 13:
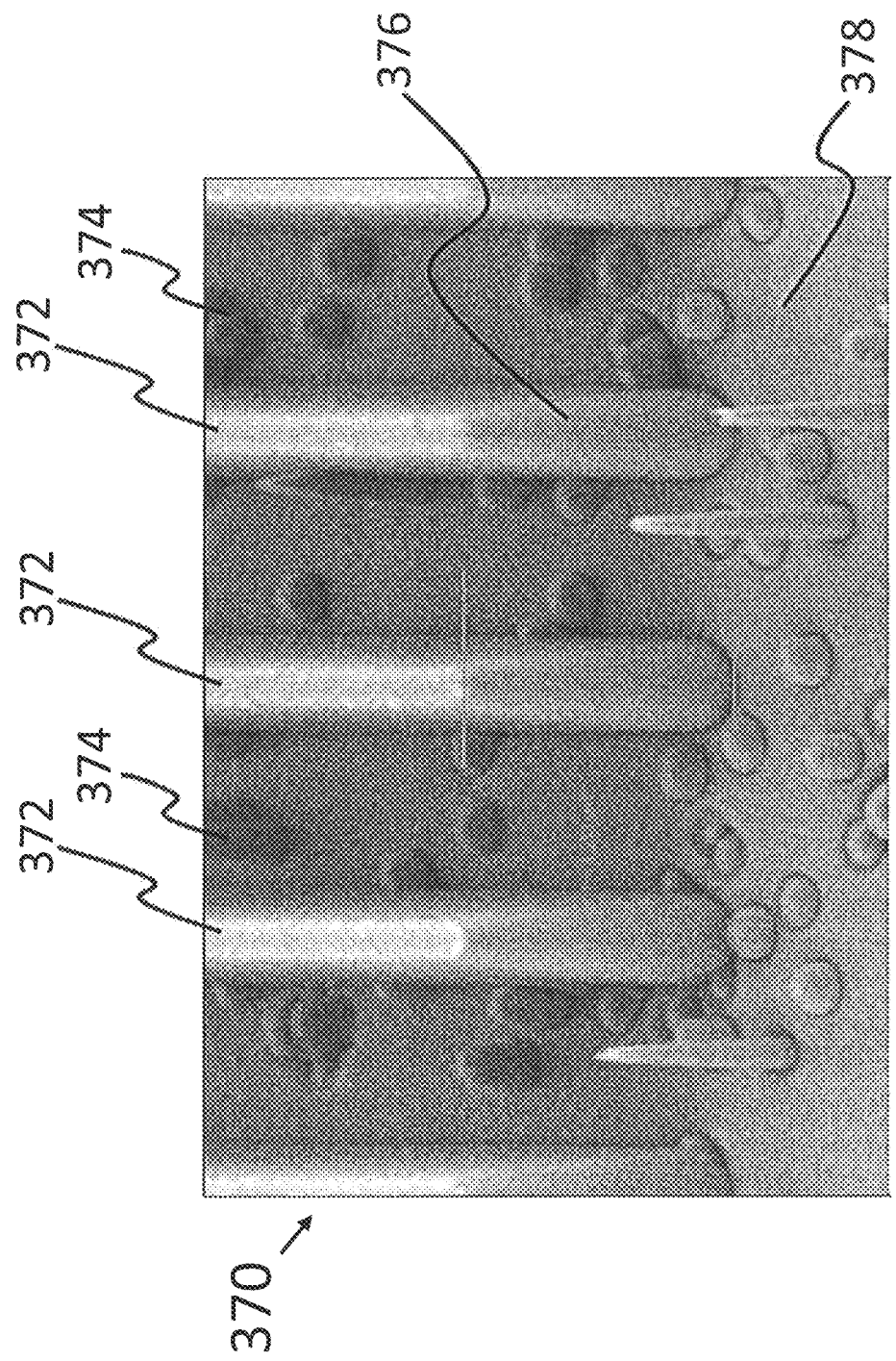
FIG. 13 is a micrograph of a wide-open duty cycle fused silica grating.

A micrograph of a fused silica grating 372 with a wide-open duty cycle is shown in FIG. 13, where, it can be seen that the spurious structures extend inside the grating structure as well 374. An etch depth of 4.25 µm is illustrated for the grating structure, but again due to the angle of projection, the actual depth is approximately twice the apparent etch depth shown, or approximately 8.5 µm. This slightly smaller etch depth for the wider open duty cycle grating indicates that etch depth is dependent on the width of the structure being etched. As a result, the optimization trades are dependent on the duty cycle of the structure and possibly on the location of the grating sample on the wafer as well.

Figure 14:
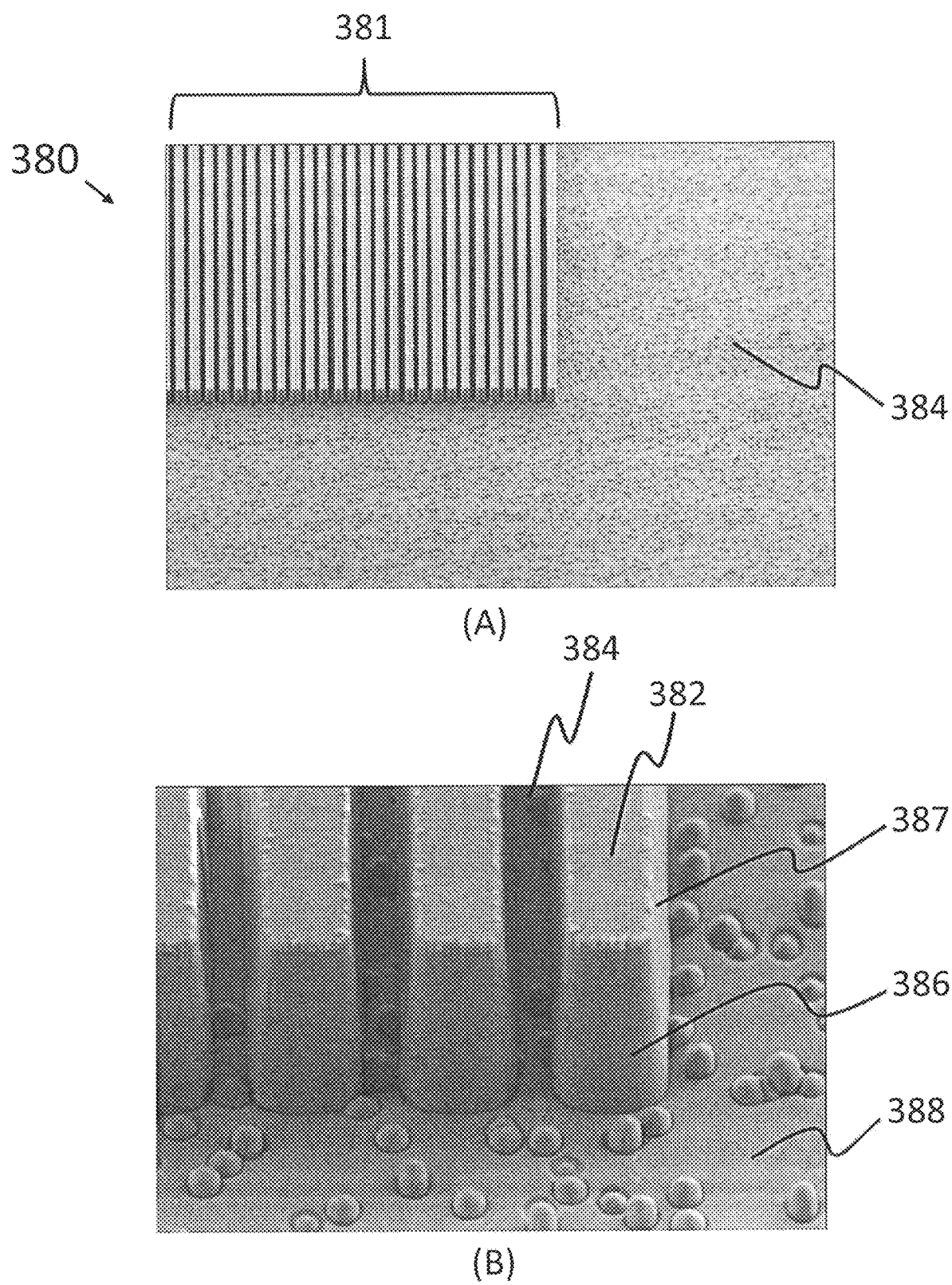
FIGS. 14A and 14B show different magnification micrographs of a fused silica grating with a wider duty cycle.

A more even aspect ratio grating is presented in FIGS. 14A and 14B under both low and high magnifications, respectively. Not only is the grating 381 plainly visible, but it is surrounded by a field 384 of the spurious structure. It is important to eliminate the spurious structure since it may cause optical scatter in the spectrometer, resulting in both spatial and spectral cross-talk. Spurious structures such as these are common and they can be eliminated with further process optimization. Due to the masking procedure used in this process, the grating structure rises above the background. This is in contrast to earlier grating runs where the grating structure was etched below the substrate.

Figure 15:
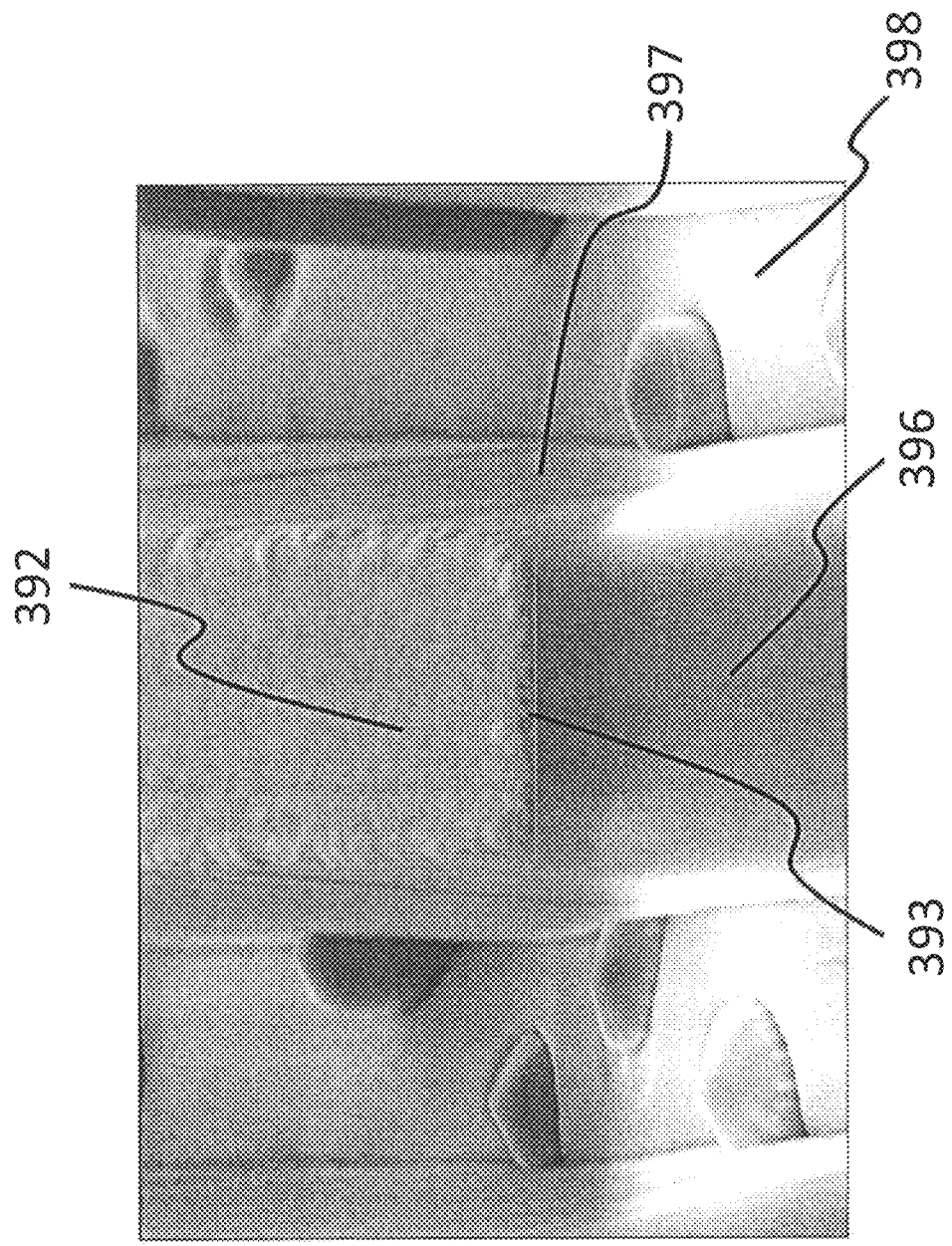
FIG. 15 shows a micrograph of a residual aluminum mask on a fused silica grating.

Upon close inspection, the micrograph of FIG. 15 reveals that there is approximately one to two tenths of a micron aluminum mask 393 left on the grating surface 392. This is an encouraging result since once the side walls 397 are made more vertical, it suggests that much larger etch depths can be obtained using this mask and etch technique.

High Efficiency LWIR Volume Transmission Gratings

Volume Transmission Grating Design

Figure 16:
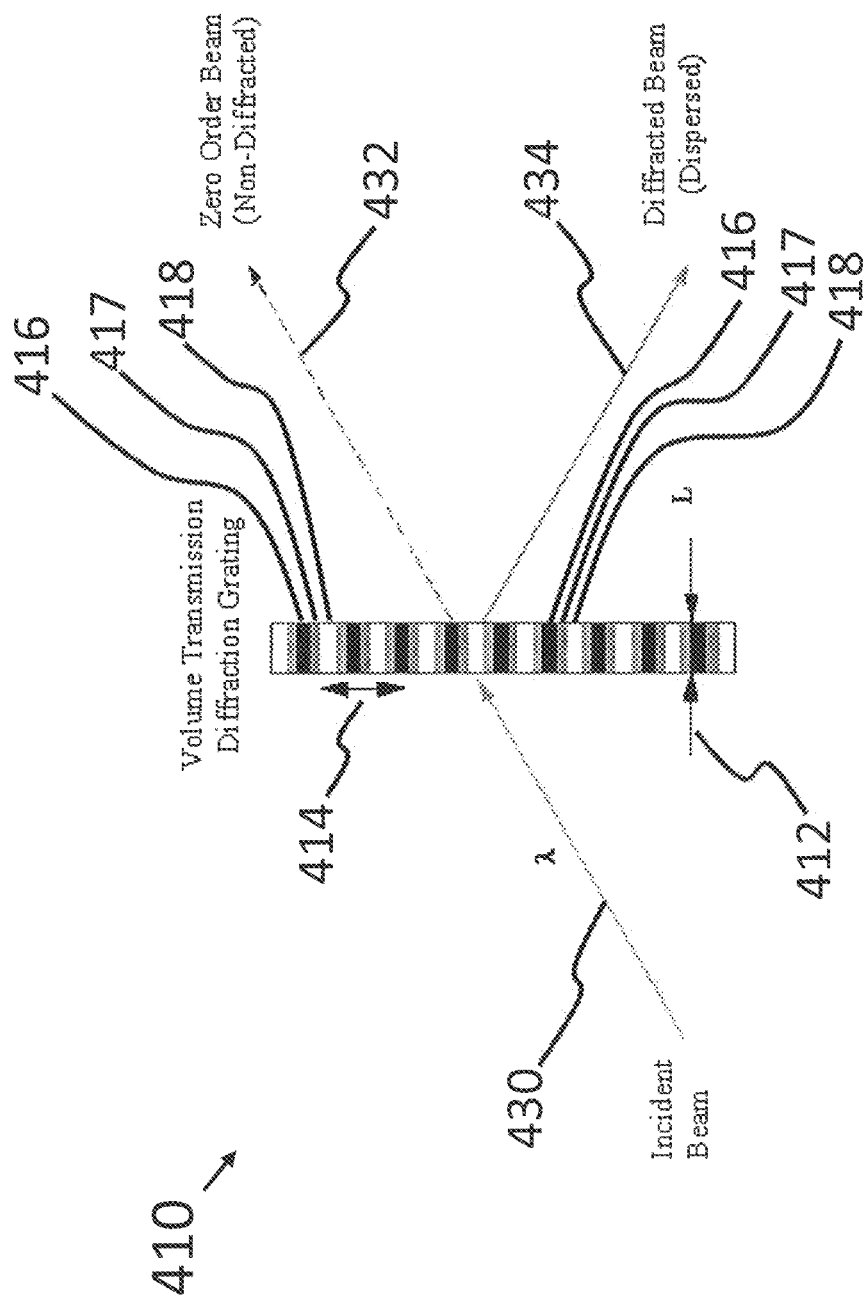
FIG. 16 is a sectional view showing the operation of a volume transmission diffraction grating.

A key enabling technology for the high performance compact hyperspectral imaging sensors developed in this effort is the high efficiency LWIR volume transmission diffraction grating. Volume transmission gratings and their theory of operation are well known, but still represent a niche area in comparison with the more common blazed reflective gratings. When the operation of these gratings is based on phase modulation resulting from a volume variation of refractive index, these elements exhibit diffraction efficiencies near 100% with broad spectral bandwidths. The key to optimizing the performance of these elements for spectrometer applications is to balance the thickness L, period Λ, and wavelength λ appropriately in order to operate the gratings in the quasi-Bragg regime (FIG. 16). This occurs when the product of the wavelength and grating thickness are roughly equal to the square of the spatial period of modulation as given by Stone and George (T. Stone and N. George, "Wavelength Performance of Holographic Optical Elements," Applied Optics, Vol. 24, p. 3797, 1985; and T. Stone and N. George, "Bandwidth of holographic optical elements," Optics Letters, Vol. 7, p. 445, 1982). When operating in this regime, the peak efficiency drops only slightly from 100% while the spectral bandwidth becomes extremely broad. These types of volume transmission gratings have been extensively fabricated for the visible and near IR spectral regions using holographic techniques and volume phase recording materials.

Figure 17:
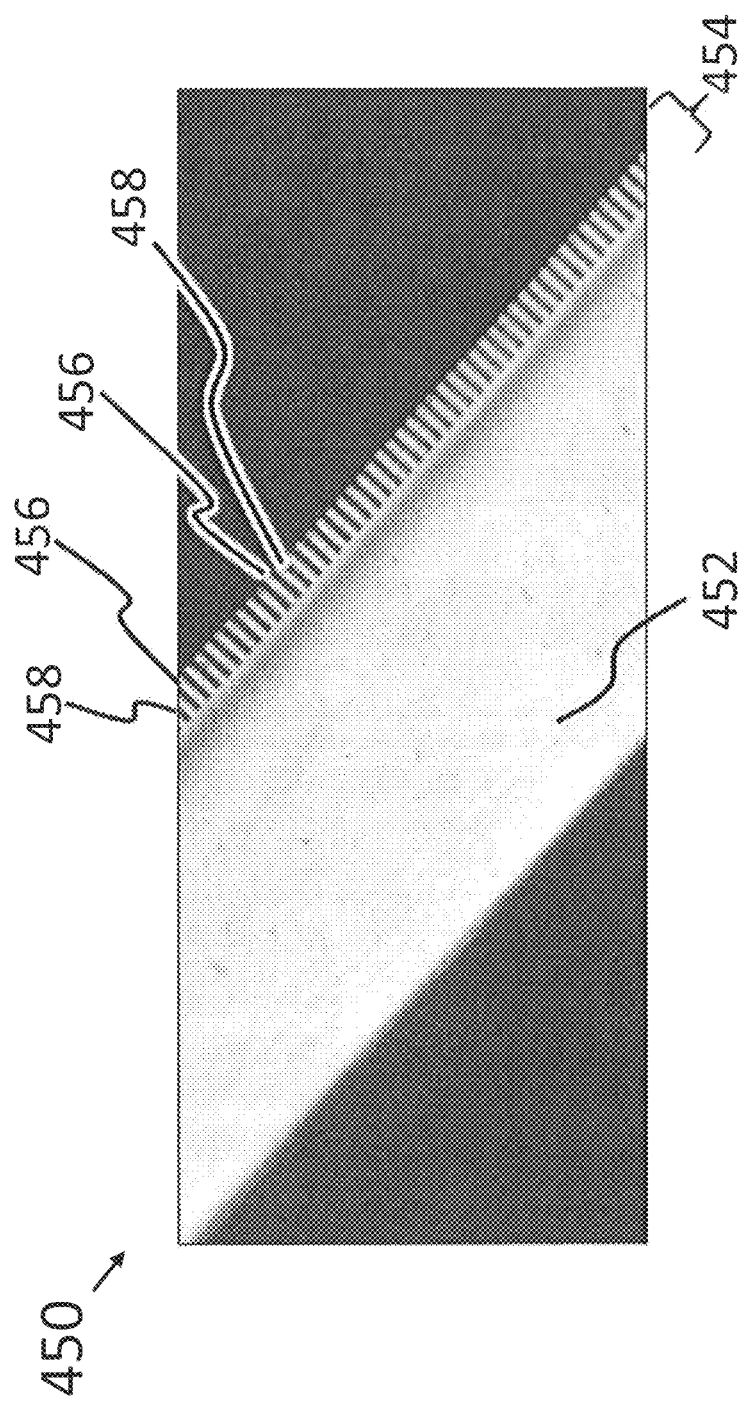
FIG. 17 is a cross-sectional photomicrograph of a cleaved silicon grating.

FIG. 17 is a photomicrograph 450 of a cleaved cross section 452 from a deeply etched lithographically fabricated silicon diffraction grating. The wafer is 500 µms thick, and the process used to etch these structures has been used to etch structures with sharp side walls at depths of hundreds of µms and even entirely through 500 µm wafers. As the aspect ratio of these structures is increased, there is eventually some degradation to the sharpness of the profile, but from the photomicrograph FIG. 17, it can be seen that none of these effects occurred for the aspect ratios used in this effort.

Deposition of Germanium on Silicon Grating Structures

Figure 18:
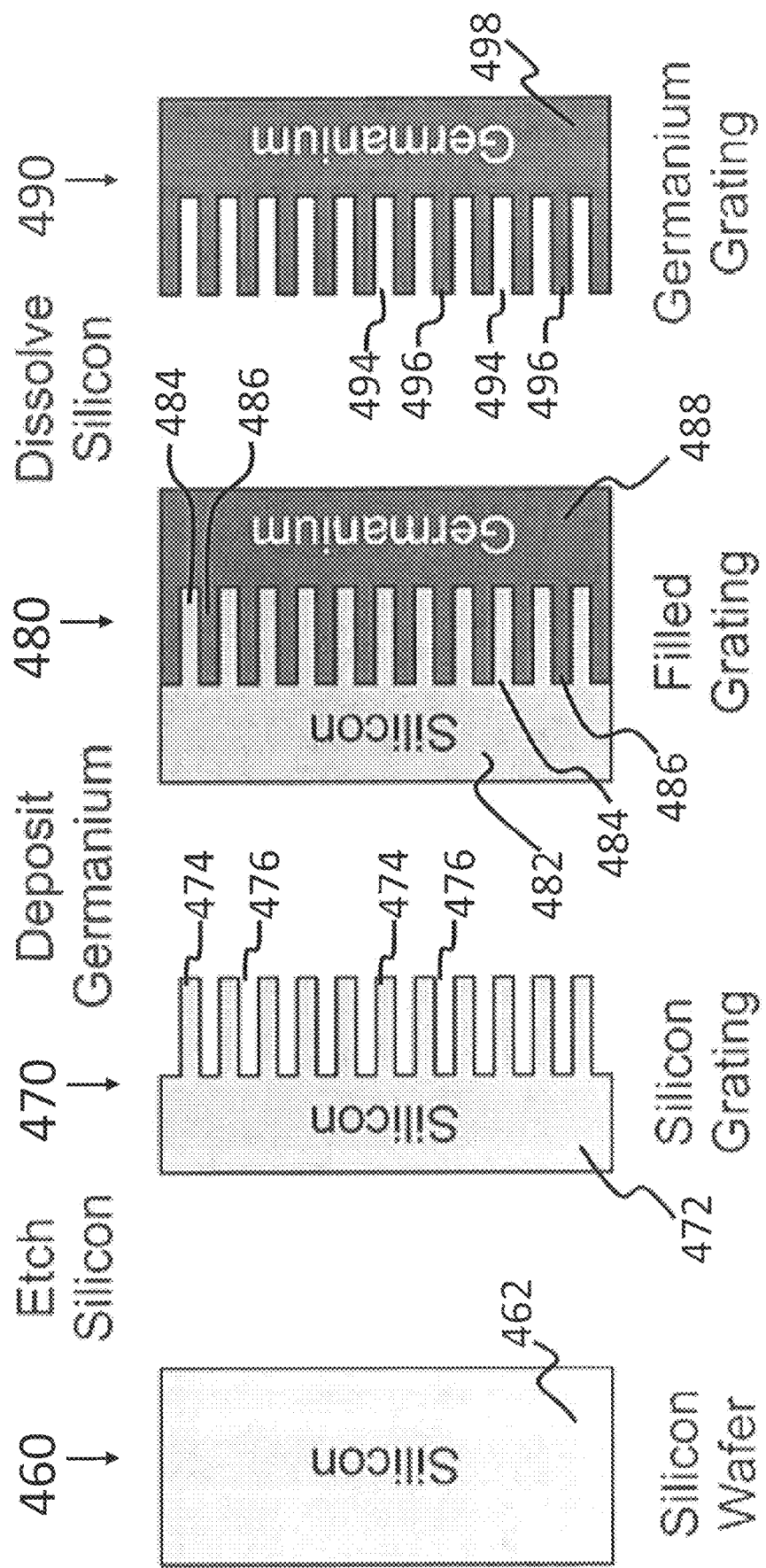
FIG. 18 shows steps of germanium grating fabrication using LPCVD.

In an alternative approach, the deeply etched silicon grating can be used to form high aspect ratio germanium gratings through the germanium deposition process illustrated FIG. 18. In this process, a silicon wafer 462 is first etched to the desired spatial period and depth. Then, instead of depositing poly-silicon as described previously, poly-germanium 488 can be deposited. This should be readily accomplished using Low Pressure Chemical Vapor Deposition (LPCVD), for example, which with germanium is accomplished at even lower temperatures than with poly-silicon. After the germanium deposition, the silicon 482 can then be dissolved with one of a variety of solvents that are selective to silicon and do not attack the germanium 488, leaving behind the germanium grating structure 498.

To tune the refractive index modulation, this germanium grating can be subsequently filled with a material of differing refractive index such as, for example, poly-crystalline or amorphous germanium that has a different refractive index than that of the host grating. This is similar to what was done in the filled silicon grating feasibility experiment described below. As with poly-silicon deposition, the crystal size of the poly-germanium (ranging from coarse crystal domains toward the amorphous limit) can be varied with deposition temperature and can provide a fine tuning mechanism for the final grating refractive index modulation for optimizing efficiency and spectral bandwidth.

Molding of Germanium on Silicon Grating Structures

Figure 10:
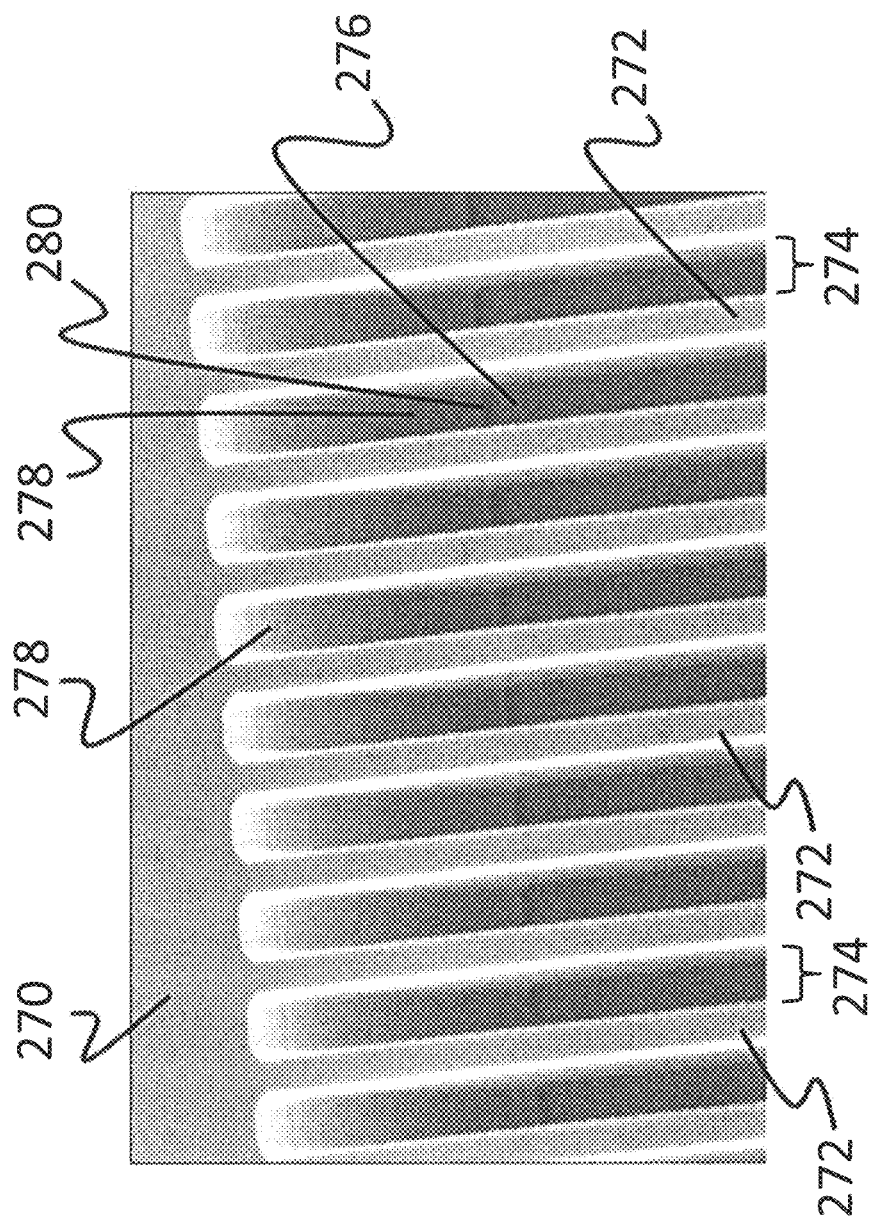
FIG. 10 is a SEM photomicrograph of a deep-etched transmission grating in silicon.

Additional LWIR volume transmission grating fabrication techniques were developed, which were based on using mass-producible deep-etched silicon gratings as molds for an inexpensive molding process. The electron micrograph of FIG. 10 illustrates the deep, high aspect patterning that is readily achievable using standard silicon processing techniques. These deep-etched silicon structures can be used as a mold for fabricating gratings from materials other than silicon. Silicon is an ideal mold material due to its etching properties, very low cost, and the abundance of high yield patterning processes which are already developed.

Figure 19:
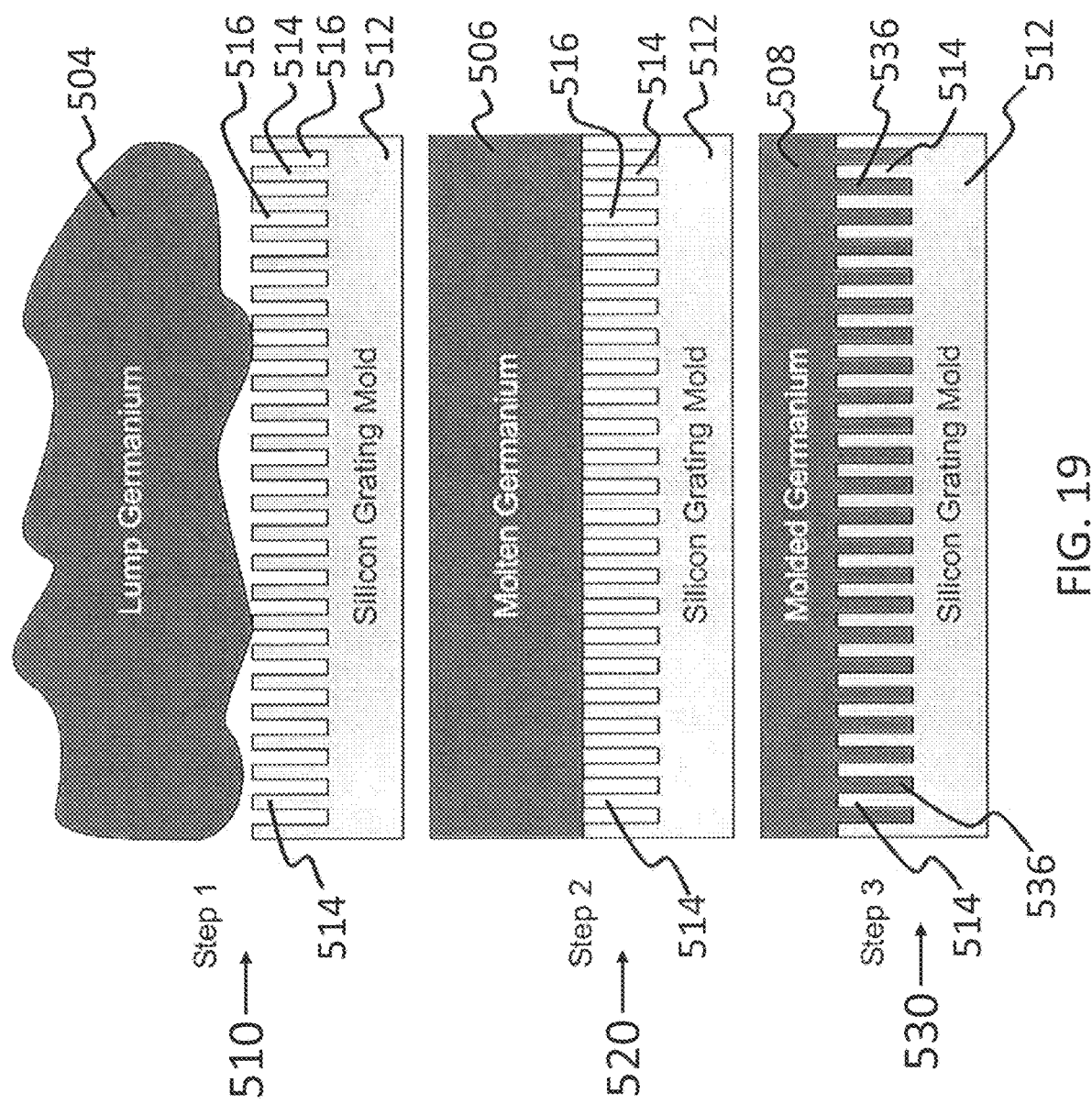
FIG. 19 shows steps f germanium grating fabrication using a silicon mold.

The molding process developed during the Phase I effort for fabricating LWIR volume transmission diffraction gratings is illustrated as a three step process in FIG. 19. In this molding process, a lump 504 of desired grating material (germanium in this case) is first placed on a patterned silicon grating mold 512 as shown in Step 1. These components are next placed in a vacuum furnace, where the fill material is melted as shown in Step 2. The vacuum environment prevents spurious reactions including the formation of any oxides or nitrides. As shown in Step 3, the vacuum environment also allows for the forced filling 536 of the deep trenches, and depending on the surface tensions and wetting properties of the materials, the vacuum furnace chamber may also be backfilled with an inert gas to force the molten fill material conformably into the mold.

Figure 20:
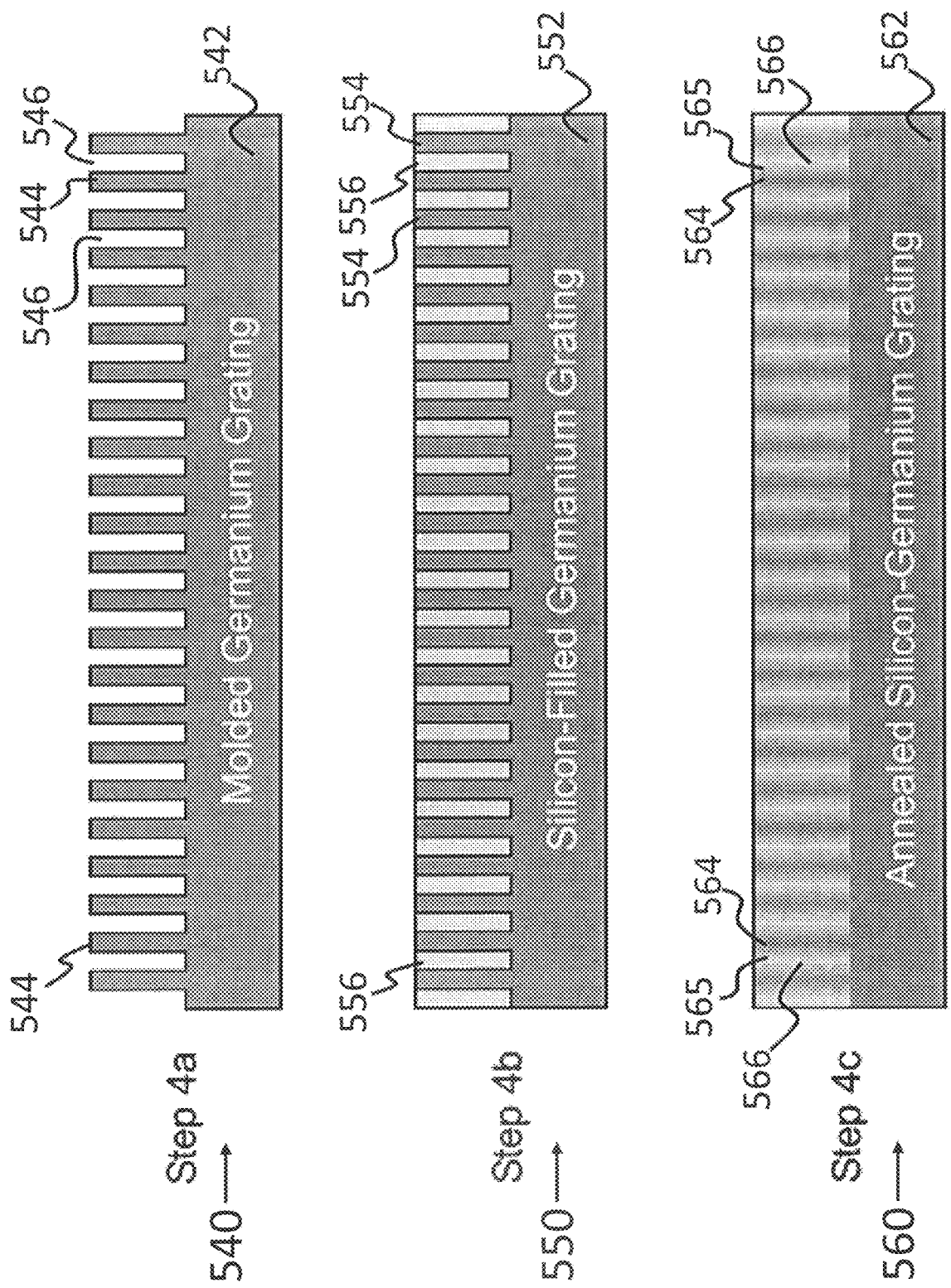
FIG. 20 shows finishing steps for gratings fabricated using a silicon mold.

At this stage, there are a number of optional finishing steps, each resulting in differing grating structures. FIG. 20 illustrates three examples of these finishing "fourth steps" that follow the three molding steps illustrated in FIG. 19. In step 4*a*, the silicon mold is dissolved away, leaving only the deep etched germanium grating 542. Excellent silicon-selective solvents exist for this purpose. This pure germanium grating 542 can be used "as is," or as a germanium mold for another molding cycle in which a third material is filled into the germanium grating to provide the desired transmission band and refractive index variation.

Another option, shown as step 4*b* in FIG. 20, illustrates the result of the mechanical grinding-away and polishing of the base of the silicon mold, resulting in a silicon-filled germanium grating 552. For systems operating in the LWIR spectral band, the absorption effects of the silicon filling is negligible, especially where narrow duty-cycles are used. For example, if a 90%-open duty cycle is used in the silicon mold, then only 10% of the modulated region of the germanium grating will contain silicon, which itself only partially absorbs in the LWIR band. Furthermore, for typical modulation depths of approximately 100 µms or less, the resulting absorption of the silicon would be on the order of only 0.5% for the 9 µm absorption band, which is likely to be insignificant to the overall system performance.

In another variation shown in step 4*c* of FIG. 20, the silicon-filled germanium grating is annealed, forming a spatially-varying alloyed silicon-germanium volume transmission grating. Silicon-germanium alloys are in wide use in the microelectronics industry, and other combinations of materials may also be readily used with the techniques described here. In addition to resolving stresses in the modulated structure, this process can lead to a more smoothly varying (if not nearly sinusoidal) refractive index profile in place of the more stepped square-wave modulation typical of lithographically fabricated volume transmission gratings. Further, this annealing process can be used to provide a very sensitive control of the refractive index modulation for the volume transmission grating that will be useful in optimizing the peak efficiencies and the spectral bandwidths of the resulting volume transmission gratings. The molding techniques described here can also be applied to other filling and annealing techniques such as sputtering, evaporating, and CVD, but these molding techniques hold the promise of very low cost and high quality LWIR transmission grating fabrication.

Feasibility Experiments Supporting Fabrication by Deposition

Fabrication Overview

The feasibility of fabricating LWIR volume transmission gratings by filling lithographically fabricated diffraction gratings with materials of varying refractive index was experimentally demonstrated. This filling process represents an important asset in the design of these transmission gratings since it provides a method of fine control over the refractive index modulation for optimizing the peak diffraction efficiency and spectral bandwidth of volume transmission gratings.

In a related effort, arrays of silicon volume transmission gratings were successfully made to demonstrate the broad feasibility of fabricating high performance transmission diffraction gratings for the Visible, NIR, SWIR, MWIR, and LWIR spectral bands using lithographic techniques. In the feasibility experiment for LWIR gratings, some of these deeply etched silicon grating arrays were filled with poly-silicon material using a low pressure chemical vapor deposition (LPCVD) technique performed using the facilities of the Cornell Nanoscale Science and Technology Facility at Cornell University (NNF-CNF). A photograph of one of these poly-silicon-filled diffraction grating arrays is shown FIG. 21.

Figure 21:
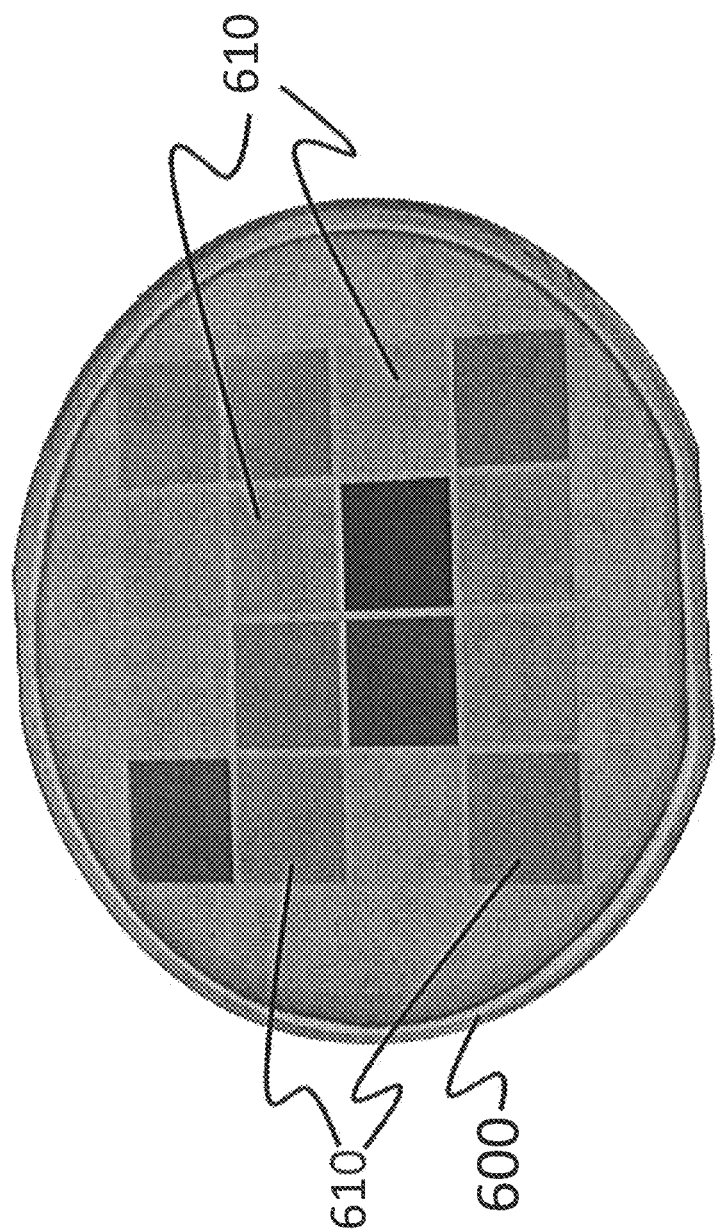
FIG. 21 shows a filled silicon transmission grating array.

In FIG. 21, gratings 610 in the silicon wafer 600 were "filled" with poly-silicon using low pressure chemical vapor deposition (LPCVD). The poly-silicon has a refractive index that can be varied from that of the crystalline silicon substrate by controlling the deposition parameters. This and related filling techniques provide the ability to tune the refractive index modulation of the volume transmission gratings in order to optimize peak diffraction efficiency and spectral bandwidth. The fabrication and filling of these gratings was performed using the facilities of the Cornell Nanoscale Science and Technology Facility (NNF-CNF) at Cornell University.

In this process, the temperature and deposition rates are chosen to allow the poly-silicon to fill the etched grating structure and the size of the crystalline regions in the poly-silicon are varied by controlling the growth conditions, which in turn varies the refractive index of the fill material accordingly. This and related filling techniques (e.g., sputtering, thermal evaporation, etc.) provide the ability to fine tune the refractive index modulation of the volume transmission gratings in order to optimize peak diffraction efficiency and spectral bandwidth.

Each of the 16 gratings 610 in the array has a unique combination of spatial period (10 or 20 μms) and modulation duty cycles ranging from 10% to 90%. This experiment shows the feasibility of using deposition techniques to optimize the refractive index modulation in lithographically fabricated LWIR diffraction gratings to achieve the desired high efficiency, broadband characteristics.

Filling Deep-Etched Grating Structures Using LP-CVD

In order to produce high efficiency volume transmission gratings in the LWIR band, there must be a procedure for producing a controllable refractive index modulation with the proper spatial period throughout a deep enough region to bring the structure into the Quasi-Bragg regime. The depths over which the refractive index modulation needs to be maintained ranges from tens to hundreds of μms depending on the spatial period and wavelength in the medium. Experimental evidence was obtained that clearly shows the feasibility of filling very deep high-aspect-ratio diffractive structures with materials of varying refractive index. This feasibility comes in two parts: First the feasibility of making high-aspect ratio grating structures that are tens to hundreds of μms deep; and second, the feasibility of filling such deep structures with materials of the desired refractive index.

Figure 22:
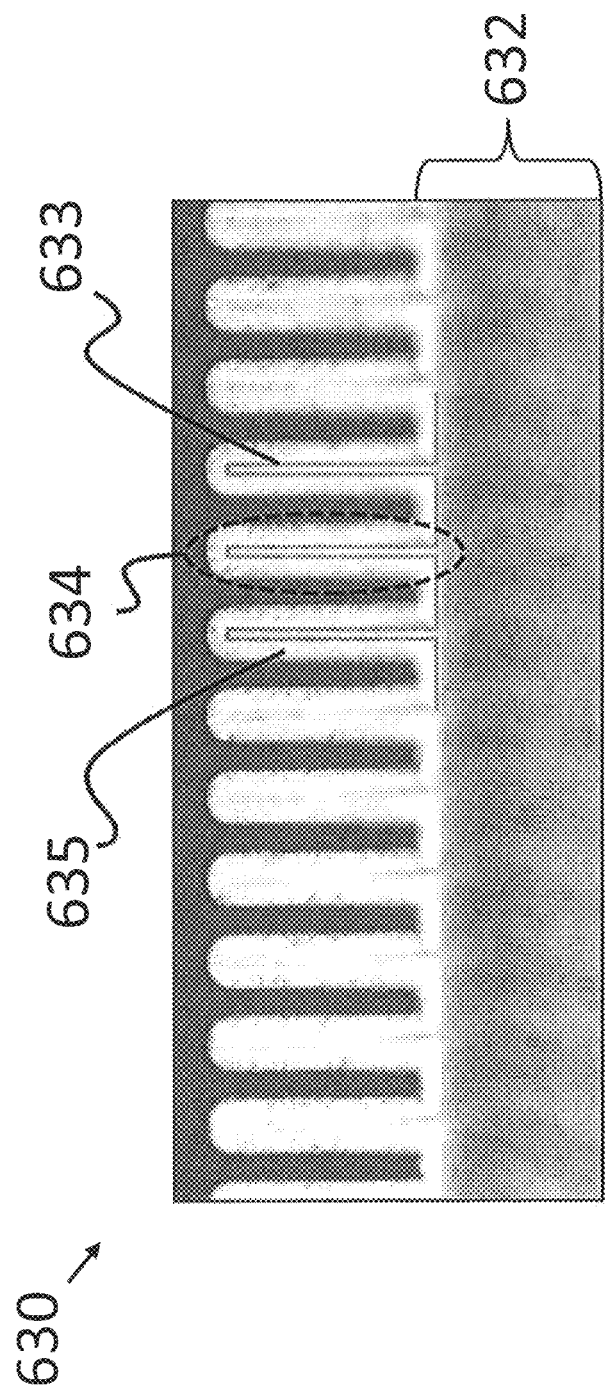
FIG. 22 shows a close-up of the cross-section of the poly-silicon-filled large open-duty-cycle silicon grating.

We obtained experimental evidence that clearly demonstrates the feasibility of filling the deep-etched structures as shown in FIG. 18 with poly-silicon or poly-germanium using Low Pressure Chemical Vapor Deposition (LP-CVD). FIG. 22 is a photomicrograph of a cleaved silicon grating in cross-section that originally looked much like that shown in FIG. 18, but was then subject to the deposition of a poly-silicon layer using LP-CVD.

The period of the grating illustrated in FIG. 22 is 20 μm, and the silicon grating facets are now coated with a layer of poly-silicon. By varying deposition parameters such as the temperature and reactant flows used in the LP-CVD, the deposited silicon can range anywhere from completely amorphous to poly-silicon with varying degrees of crystallinity. This variation in crystallinity is accompanied by a variation in the refractive index of the deposition material with respect to the host wafer material. Furthermore, as an alternative poly-germanium can be deposited in place of the poly-silicon and the refractive index can be tuned using annealing-induced diffusion or alloying. The structure visible in the silicon wafer cleaved surface below the grating may be evidence of stress related to the deposition, which can be reduced with either annealing and/or parameter variations.

The close-up photomicrograph of the coated grating illustrated in FIG. 22 shows where the superimposed red line profile 633 outlines the large open-duty-cycle of the uncoated silicon grating structure. A key observation is that the deposited material coats the silicon grating facets 634 very evenly all the way down the depth of the facet. This is particularly important in order to avoid the "pinching off" of the deposition that would result if the deposition rate is higher on the top surface of the facts than deep in the trenches. Part of this uniformity is accomplished by controlling the temperature during deposition to allow the deposited atoms mobility to evenly spread over the surface.

Figure 23:
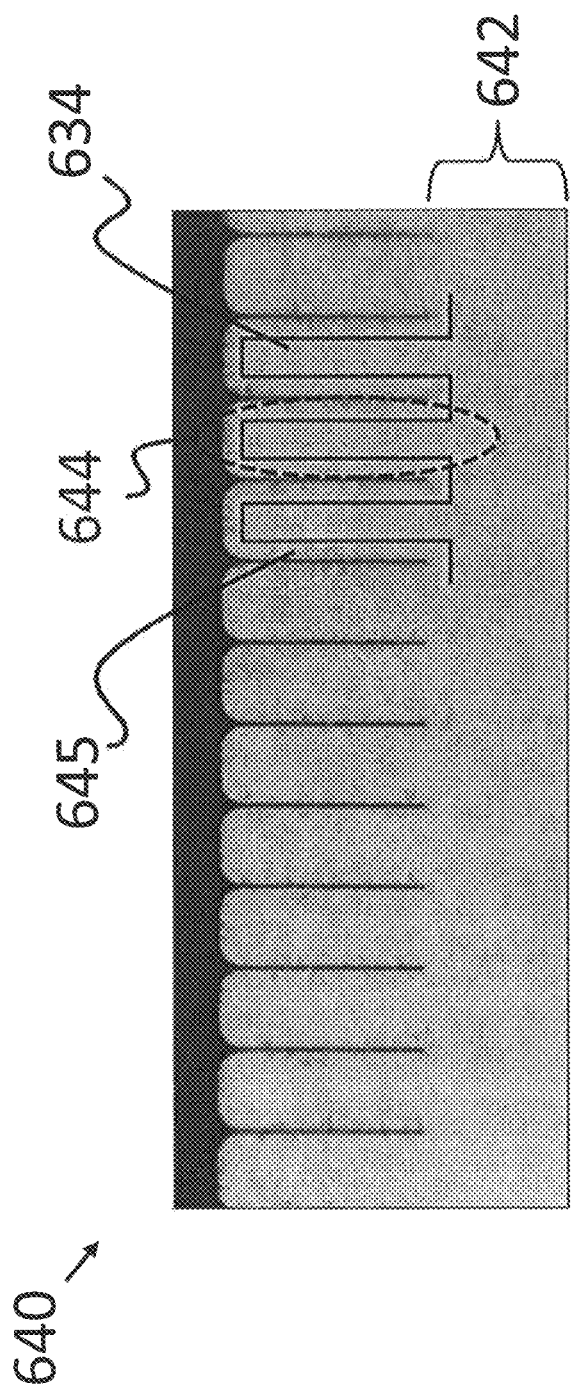
FIG. 23 shows a close-up of the cross-section of the poly-silicon-filled medium open-duty-cycle silicon grating.

FIG. 23 illustrates another 20 μm period silicon grating that has been subjected to the same deposition process, but in this case the grating has a smaller open-duty-cycle than that of the grating shown in FIG. 22, such that the silicon coating fills nearly the entire grating except for a very thin gap. The close-up photomicrograph of this coated grating shows where the superimposed line profile 634 outlines the medium open-duty-cycle of the uncoated silicon grating structure. This magnified view illustrates the tremendous utility of the LP-CVD technique, as the original silicon grating facets 645 are uniformly coated leaving a tiny gap in tact all the way to the bottom of the facet. This is a strong demonstration of the feasibility for making very deep, high aspect grating structures.

Figure 24:
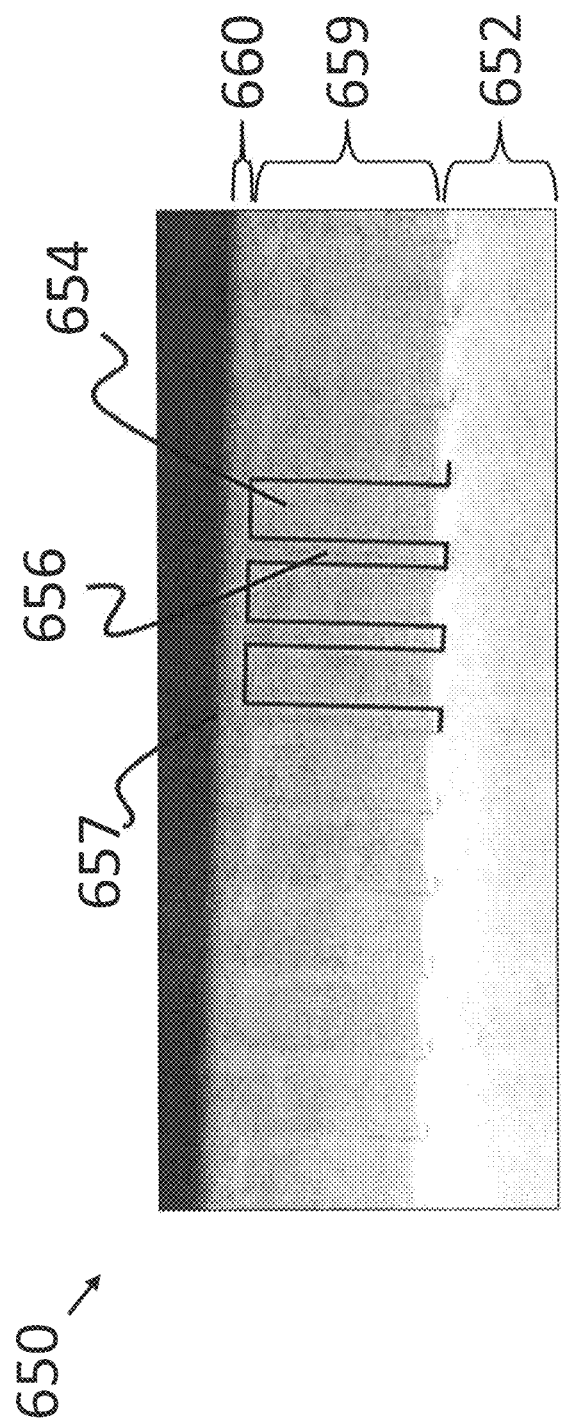
FIG. 24 shows a cross-section of a 20 µm period poly-silicon-filled small open-duty-cycle silicon grating.

FIG. 24 illustrates a close-up photomicrograph of yet another 20 μm period silicon grating that has been subjected to the same deposition process, but in this case the grating has a still-smaller open-duty-cycle than those of the gratings shown in FIG. 22, such that the silicon coating now fills the entire grating structure and even overcoats the grating on top. The superimposed line profile outlines the small open-duty-cycle of the uncoated silicon grating structure where the wide silicon grating facets 654 are clearly visible extending up from the silicon wafer substrate. In between the silicon facets, it can be seen that the gaps 656 are uniformly filled with poly-silicon leaving no apparent voids. In addition, the poly-silicon is seen to overfill the gap regions and form a uniform layer on top 657 of the grating. This type of uniform layer coating on the grating could be very useful for further depositing an antireflective coating layer.

Figure 25:
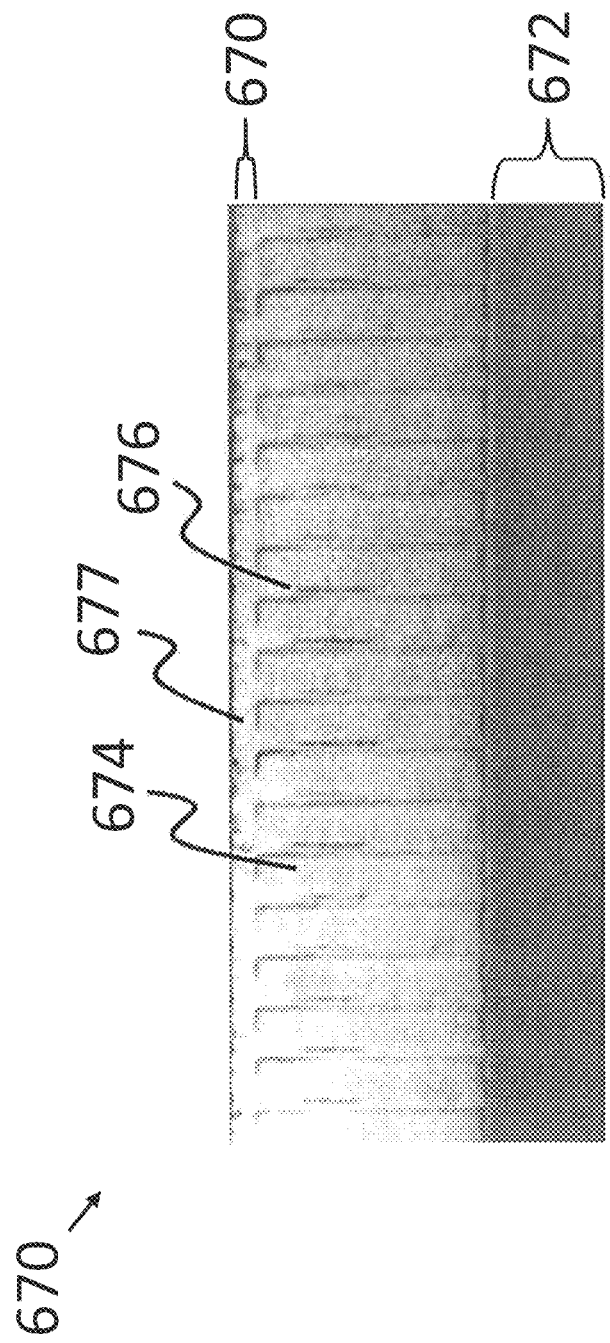
FIG. 25 shows a bright-field image of a 10 µm period poly-silicon-filled silicon grating.
Figure 26:
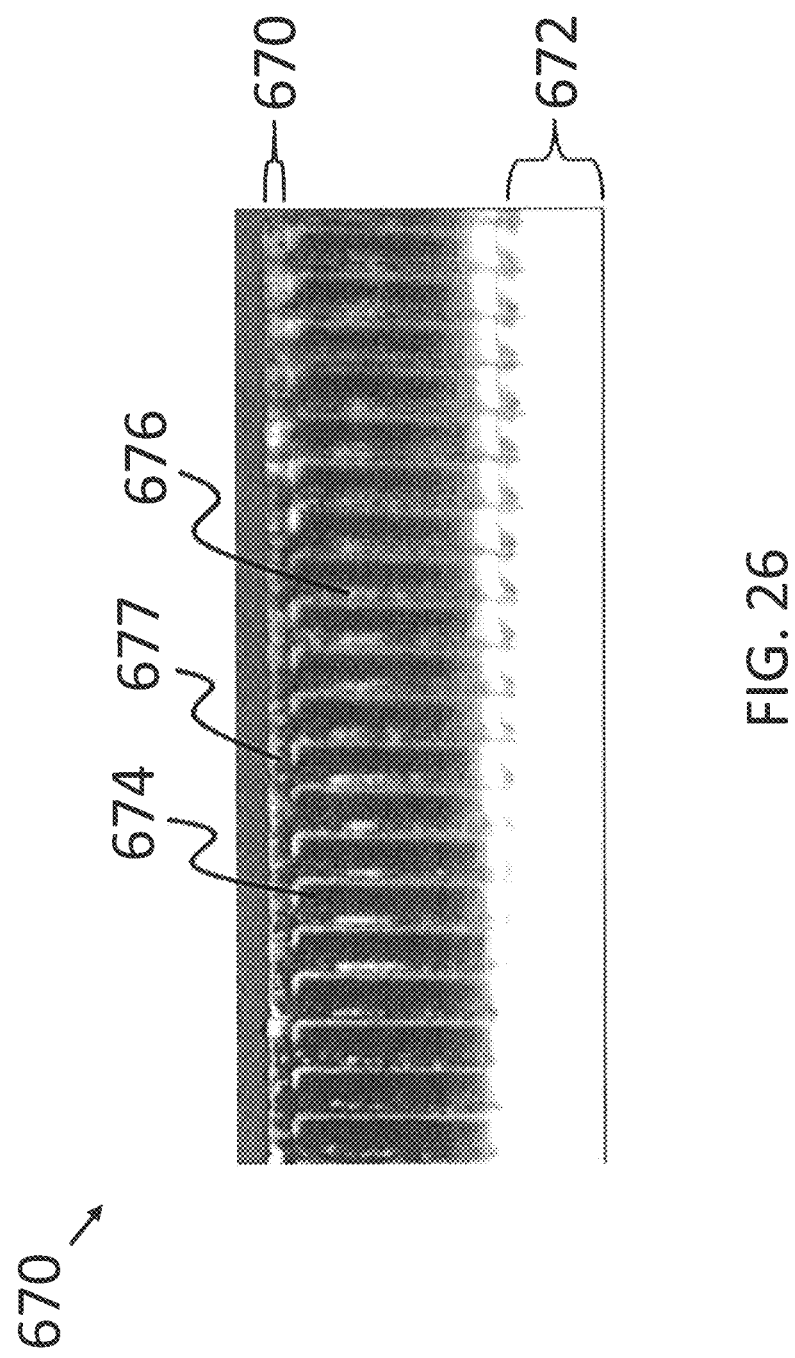
FIG. 26 shows a darkfield image of a 10 µm period poly-silicon-filled silicon grating.

FIG. 25 is a bright-field photomicrograph 670 of a 10 μm spatial period grating that was subjected to a LP-CVD poly-silicon deposition. Since the etch depth of this grating is similar to that of the gratings illustrated previously. This smaller spatial period results in an uncoated silicon grating structure that has a much higher aspect ratio. Even still, it is apparent from this illustration that these deep voids 674 have been uniformly filled with the poly-silicon leaving no apparent voids, and that there is an additional coating 677 of poly-silicon over the entire grating. The poly-silicon fill and cap material is highlighted under this bright-field illumination. Similarly, FIG. 26 is a dark-field photomicrograph of the same grating and highlights the original silicon grating facets that have been filled and over-coated.

Since silicon begins to absorb at the long end of the LWIR spectral band, it is desirable to minimize the amount of silicon in the volume transmission grating. While an identical fabrication cycle using germanium wafers and poly-germanium LP-CVD deposition could be attempted, several other fabrication processes could also be pursued. For example, poly-germanium could be deposited in the silicon grating and then the silicon wafer substrate polished off. This would leave a grating that is all germanium except in the modulation region. This region need be only tens to hundreds of μms thick, and there may only need to be a small duty cycle, e.g., 10-20% of silicon, to provide the appropriate modulation. As a result, this small amount of silicon may not pose a significant source of system loss, and annealing the structure can result in a varying silicon-germanium alloy with increased LWIR transmission characteristics.

Feasibility Experiments Supporting Fabrication by Molding

Figure 27:
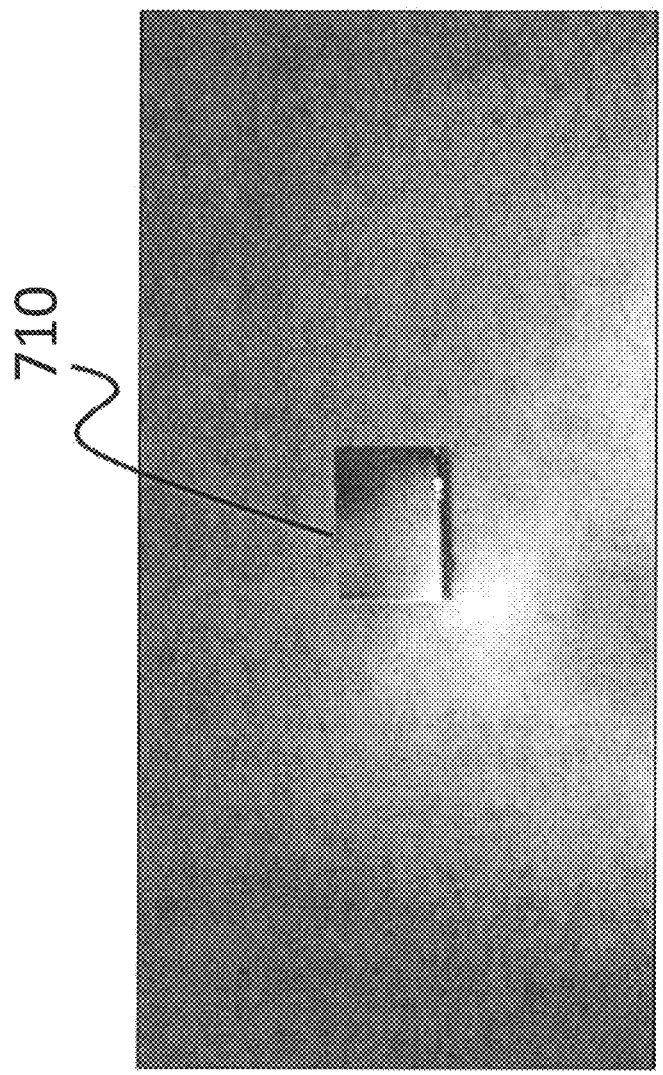
FIG. 27 shows a sample silicon grating cleaved from a grating array wafer.

The feasibility of fabricating gratings using molding techniques as a possible compliment to the LP-CVD techniques described above was experimentally demonstrated. These techniques may be useful for making or filling germanium gratings, or for inexpensively adding a substrate on top of germanium gratings formed with LP-CVD deposition into silicon gratings where the silicon substrate is subsequently polished off. The first step in these experiments was to cleave one grating sample from the silicon grating-array wafers that were described above. One of the small test gratings obtained from cleaving the wafer is shown in FIG. 27.

Figure 28:
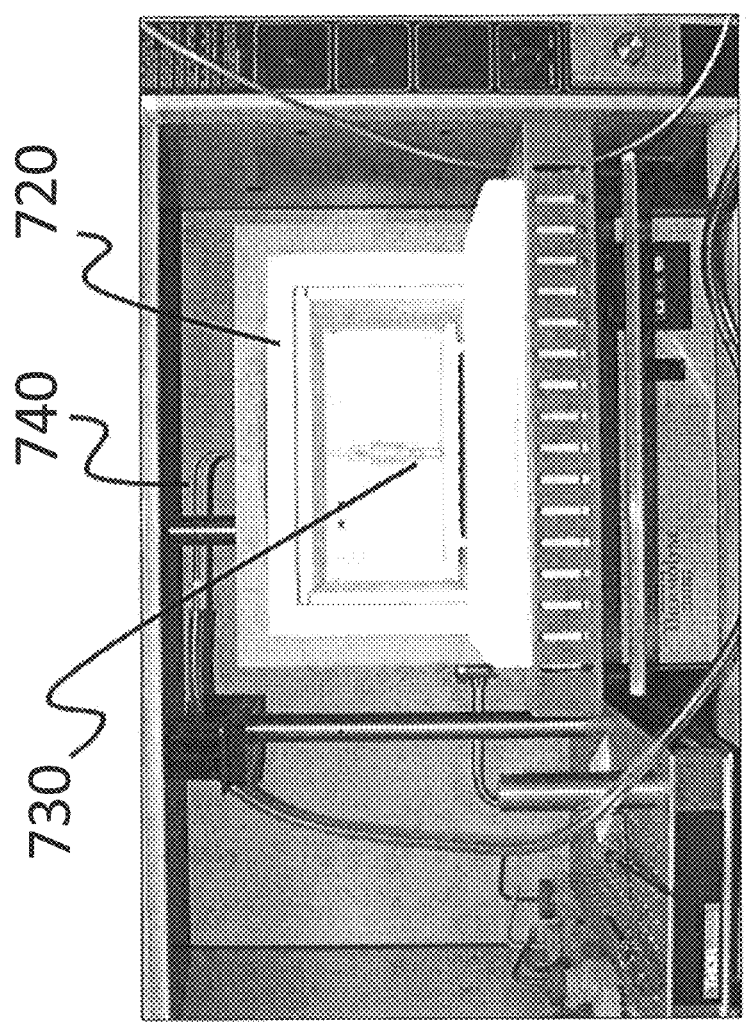
FIG. 28 shows a small fused silica test chamber in a furnace.

Fused silica test chambers were designed and built to house the grating test samples. These test chambers were designed to hold a vacuum at a temperature of 1100° C., and were connected to a gas mixing and pumping manifold that allows for evacuation of the vessel and for back-filling of the vessel with argon gas. The small test chamber 730 is shown inside a furnace 720 in FIG. 28 To fabricate the molded germanium grating, the grating sample was placed in the test chamber with small quantities of purified germanium. The sample chamber was then heated to approximately 1000° C. in an atmosphere of Argon, where the germanium was melted and partially filled the voids of the silicon test grating. The molded germanium ingot was then separated from the silicon grating. While the deep patterning of the germanium sample was not expected in this first attempt, a sharp grating structure was indeed transferred into the germanium ingot.

FIG. 29 contains a photomicrograph 800 that clearly illustrates the 20 μm period grating structure molded into the germanium. The feasibility of this technique is shown in this experiment, and the molded grating appears deeper, although not matching the silicon master in depth. It was also observed that some molten germanium flowed under the interface between the tube and the silicon grating that it was resting on. In subsequent work, surfactants and flux-like reactants can be used to decrease surface tension and allow more complete filling of the silicon structures.

The experimental gratings demonstrate the feasibility of producing LWIR volume transmission gratings that can be optimized for high efficiency and broad spectral bandwidths. While the grating development was oriented toward reducing the fabrication risks of LWIR transmission gratings, it is expected that the characterization and optimization work necessary to produce volume transmission gratings specifically optimized for the high diffraction efficiencies and broad spectral bandwidths required for the compact, lightweight LWIR hyperspectral imaging sensors can be performed.

Although the invention has been described with respect to various embodiments, it should be realized this invention is also capable of a wide variety of further and other embodiments within the spirit and scope of the invention.

The invention claimed is:

1. A method of fabricating volume diffraction gratings, the method comprising:
   selecting two materials, a first material being removable without substantially damaging a structure in a second material;
   forming a structure on a wafer of the first material using lithographic techniques, the structure comprising a number of protrusions and a number of cavities forming a grating forming layer in said wafer of the first material; said grating forming layer having a depth that is thinner than said wafer of the first material;
   depositing the second material on the structure;
   removing some of the first material, after depositing the second material, in order to provide a volume grating in the second material; and,
   annealing the volume grating; annealing process tuning refractive index modulation for the volume grating by annealing-induced diffusion or alloying.

2. A-method of fabricating volume diffraction gratings, the method comprising:
   forming a structure on a wafer of a first material, the structure comprising a number of protrusions and a number of cavities forming a grating forming layer in said wafer of the first material; said grating forming layer having a depth that is thinner than said wafer of the first material; and
   depositing a second material on the structure; and,
   annealing the structure after depositing the second material on the structure, annealing process tuning refractive index modulation for a volume grating by annealing-induced diffusion or alloying.

3. A method of fabricating volume diffraction gratings, the method comprising:
   selecting two materials;
   forming a structure on a wafer of a first material using lithographic techniques, the structure comprising a number of protrusions and a number of cavities forming a grating forming layer in said wafer of the first material; said grating forming layer having a depth that is thinner than said wafer of the first material;
   providing a quantity of a second material in proximity of said grating forming layer; and
   melting the second material in an environment that promotes flow into the number of cavities; resulting in a modified structure; and,
   annealing the modified structure; annealing process tuning refractive index modulation for the modified structure by annealing-induced diffusion or alloying.

4. The method of claim 3 further comprising removing substantially the first material outside of said grating forming layer.

5. The method of fabricating volume diffraction gratings of claim 3 wherein said environment that promotes flow into the number of cavities reduces surface tension of molten material.

6. The method of fabricating volume diffraction gratings of claim 3 wherein said environment that promotes flow into the number of cavities comprises surfactants.

7. The method of fabricating volume diffraction gratings of claim 3 wherein said environment that promotes flow into the number of cavities comprises flux-like reactants.

8. A method of fabricating volume diffraction gratings, the method comprising:
   forming a structure on a wafer of a first material, the structure comprising a number of protrusions and a number of cavities;
   said first material having a first refractive index;
   depositing a second material on the structure;
   said second material having a second refractive index;
   said first refractive index and said second refractive index not being a same refractive index; and,
   annealing the structure; said annealing used to tune refractive index modulation for a volume grating by annealing-induced diffusion or alloying.

9. A method of fabricating volume diffraction gratings, the method comprising:
   forming a structure on a wafer of a first material, the structure comprising a number of protrusions and a number of cavities;
   said first material having a first refractive index;
   depositing a second material on the structure;
   said second material having a second refractive index; and,
   said first refractive index and said second refractive index not being a same refractive index;

annealing the structure; said annealing used to tune refractive index profile for a volume grating by annealing-induced diffusion or alloying.

10. A method of fabricating volume diffraction gratings, the method comprising:
    forming a structure on a wafer of a first material, the structure comprising a number of protrusions and a number of cavities;
    said first material having a first refractive index;
    depositing a second material on the structure;
    said second material having a second refractive index;
    said first refractive index and said second refractive index not being a same refractive index; and,
    annealing the structure; said annealing used to optimize a volume grating by annealing-induced diffusion or alloying.

11. The method of fabricating volume diffraction gratings of claim 10 wherein said optimize the volume grating comprises optimizing spectral bandwidth.

12. The method of fabricating volume diffraction gratings of claim 10 wherein said optimize the volume grating comprises optimizing diffraction efficiency.

13. A method of fabricating volume diffraction gratings, the method comprising:
    forming a structure on a wafer of a first material, the structure comprising a number of protrusions and a number of cavities;
    said first material having a first refractive index;
    depositing a second material on the structure;
    said second material having a second refractive index;
    said first refractive index and said second refractive index not being a same refractive index; and,
    annealing the structure; said annealing used to obtain a smooth refractive index profile for a volume grating by annealing-induced diffusion or alloying.

14. The method of fabricating volume diffraction gratings of claim 13 wherein said smooth refractive index profile comprises a sinusoid-like profile.

\* \* \* \* \*